(12) United States Patent
Kumar et al.

(10) Patent No.: US 12,346,729 B2
(45) Date of Patent: Jul. 1, 2025

(54) RUNTIME VIRTUALIZATION OF RECONFIGURABLE DATA FLOW RESOURCES

(71) Applicant: SambaNova Systems, Inc., Palo Alto, CA (US)

(72) Inventors: Ravinder Kumar, Palo Alto, CA (US); Conrad Alexander Turlik, Palo Alto, CA (US); Arnav Goel, Palo Alto, CA (US); Qi Zheng, Palo Alto, CA (US); Raghunath Shenbagam, San Jose, CA (US); Anand Misra, Palo Alto, CA (US); Ananda Reddy Vayyala, San Jose, CA (US); Pushkar Shridhar Nandkar, Hayward, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 0 days.

(21) Appl. No.: 18/211,962

(22) Filed: Jun. 20, 2023

(65) Prior Publication Data

US 2023/0409395 A1    Dec. 21, 2023

Related U.S. Application Data

(62) Division of application No. 16/922,975, filed on Jul. 7, 2020, now Pat. No. 11,809,908.

(51) Int. Cl.
*G06F 9/50* (2006.01)
*G06F 15/78* (2006.01)

(52) U.S. Cl.
CPC .......... *G06F 9/5011* (2013.01); *G06F 9/5016* (2013.01); *G06F 9/5077* (2013.01);
(Continued)

(58) Field of Classification Search
None
See application file for complete search history.

(56) References Cited

U.S. PATENT DOCUMENTS

| 4,769,790 A | 9/1988 | Yamashita |
| 5,506,797 A | 4/1996 | Koshiba |

(Continued)

FOREIGN PATENT DOCUMENTS

| EP | 0733234 A | 6/1995 |
| EP | 1372084 A2 | 12/2003 |

(Continued)

OTHER PUBLICATIONS

NVIDIA, "NVIDIA Turing GPU Architecture", WP-09183-001_v01, 2018, 86 pages.

(Continued)

*Primary Examiner* — Abu Zar Ghaffari
(74) *Attorney, Agent, or Firm* — Flagship Patents; Sikander M. Khan; Bruce A. Young

(57) ABSTRACT

A data processing system comprises a pool of reconfigurable data flow resources and a runtime processor. The pool of reconfigurable data flow resources includes arrays of physical configurable units and memory. The runtime processor includes logic to receive a plurality of configuration files for user applications. The configuration files include configurations of virtual data flow resources required to execute the user applications. The runtime processor also includes logic to allocate physical configurable units and memory in the pool of reconfigurable data flow resources to the virtual data flow resources and load the configuration files to the allocated physical configurable units. The runtime processor further includes logic to execute the user applications using the allocated physical configurable units and memory.

5 Claims, 20 Drawing Sheets

(52) U.S. Cl.
CPC ...... *G06F 15/7867* (2013.01); *G06F 15/7871* (2013.01); *G06F 2209/501* (2013.01); *G06F 2209/5011* (2013.01)

(56) References Cited

U.S. PATENT DOCUMENTS

| | | | |
|---|---|---|---|
| 5,560,029 | A | 9/1996 | Papadopoulos et al. |
| 5,794,033 | A | 8/1998 | Aldebert et al. |
| 5,963,746 | A | 10/1999 | Barker et al. |
| 6,105,119 | A | 8/2000 | Kerr et al. |
| 6,119,181 | A | 9/2000 | Vorbach et al. |
| 6,256,653 | B1 | 7/2001 | Juffa et al. |
| 6,470,485 | B1 | 10/2002 | Cote et al. |
| 6,539,438 | B1* | 3/2003 | Ledzius ............ G06F 15/7867 710/36 |
| 6,667,983 | B1 | 12/2003 | Lo et al. |
| 6,728,871 | B1 | 4/2004 | Vorbach et al. |
| 7,015,921 | B1 | 3/2006 | Trivedi et al. |
| 7,472,149 | B2 | 12/2008 | Endo |
| 7,734,895 | B1 | 6/2010 | Agarwal et al. |
| 7,797,258 | B1 | 9/2010 | Bowman et al. |
| 7,952,387 | B1 | 5/2011 | Frazer |
| 7,996,684 | B2 | 8/2011 | Wasson et al. |
| 8,006,021 | B1 | 8/2011 | Li et al. |
| 8,045,546 | B1 | 10/2011 | Bao et al. |
| 8,184,317 | B2 | 5/2012 | Okamoto |
| 8,261,042 | B2 | 9/2012 | Kanstein et al. |
| 8,271,557 | B1* | 9/2012 | Lysaght ............ G06F 16/196 709/225 |
| 9,009,723 | B2 | 4/2015 | Degenaro et al. |
| 9,201,899 | B2 | 12/2015 | Nishimura et al. |
| 9,335,977 | B2 | 5/2016 | Wang et al. |
| 9,411,532 | B2 | 8/2016 | Vorbach et al. |
| 9,411,756 | B2 | 8/2016 | Nogueira et al. |
| 9,501,325 | B2 | 11/2016 | Pell et al. |
| 9,569,214 | B2 | 2/2017 | Govindu et al. |
| 9,690,747 | B2 | 6/2017 | Vorbach et al. |
| 9,697,318 | B2 | 7/2017 | Hutton et al. |
| 9,875,105 | B2 | 1/2018 | Rozas et al. |
| 9,952,831 | B1 | 4/2018 | Ross et al. |
| 10,037,227 | B2 | 7/2018 | Therien et al. |
| 10,067,911 | B2 | 9/2018 | Gholaminejad et al. |
| 10,186,011 | B2 | 1/2019 | Nurvitadhi et al. |
| 10,331,836 | B1 | 6/2019 | Hosangadi et al. |
| 10,621,138 | B2 | 4/2020 | Hu et al. |
| 10,698,853 | B1 | 6/2020 | Grohoski et al. |
| 10,831,507 | B2 | 11/2020 | Shah et al. |
| 11,080,227 | B2 | 8/2021 | Koeplinger et al. |
| 2003/0068097 | A1 | 4/2003 | Wilson et al. |
| 2003/0108119 | A1 | 6/2003 | Mohebbi et al. |
| 2004/0049672 | A1* | 3/2004 | Nollet ............ G06F 15/7867 713/100 |
| 2004/0088666 | A1 | 5/2004 | Poznanovic et al. |
| 2004/0153608 | A1 | 8/2004 | Vorbach et al. |
| 2005/0108503 | A1 | 5/2005 | Sandon et al. |
| 2005/0160129 | A1 | 7/2005 | Endo |
| 2007/0180172 | A1 | 8/2007 | Schmidt et al. |
| 2007/0220522 | A1 | 9/2007 | Coene et al. |
| 2008/0013448 | A1 | 1/2008 | Horie et al. |
| 2009/0135739 | A1 | 5/2009 | Hoover et al. |
| 2009/0172351 | A1 | 7/2009 | Vorbach et al. |
| 2009/0187756 | A1 | 7/2009 | Nollet et al. |
| 2009/0300209 | A1 | 12/2009 | Elzur |
| 2012/0079498 | A1* | 3/2012 | Kim ............ G06F 9/5066 718/104 |
| 2012/0126851 | A1 | 5/2012 | Kelem et al. |
| 2012/0131257 | A1 | 5/2012 | Rudosky et al. |
| 2012/0303930 | A1* | 11/2012 | Coker ............ G11B 5/012 711/207 |
| 2013/0151576 | A1 | 6/2013 | Lutz et al. |
| 2013/0339564 | A1 | 12/2013 | Nogueira et al. |
| 2014/0040334 | A1 | 2/2014 | Burgess et al. |
| 2014/0137123 | A1 | 5/2014 | Hartmann et al. |
| 2014/0201642 | A1 | 7/2014 | Vicat-Blanc |
| 2014/0237227 | A1 | 8/2014 | Aizawa et al. |
| 2014/0258438 | A1 | 9/2014 | Ayoub et al. |
| 2014/0317628 | A1 | 10/2014 | Kim |
| 2015/0058614 | A1 | 2/2015 | Degenaro et al. |
| 2015/0100971 | A1 | 4/2015 | Dube et al. |
| 2015/0106823 | A1 | 4/2015 | Canoy et al. |
| 2015/0347192 | A1 | 12/2015 | Blaine et al. |
| 2016/0012012 | A1 | 1/2016 | Yen et al. |
| 2016/0134702 | A1 | 5/2016 | Gertner |
| 2016/0210167 | A1* | 7/2016 | Bolic ............ G06F 9/45558 |
| 2016/0308719 | A1 | 10/2016 | Putnam et al. |
| 2016/0314025 | A1 | 10/2016 | Mcgarry et al. |
| 2016/0335120 | A1* | 11/2016 | Gupta ............ G06F 9/5044 |
| 2017/0054449 | A1 | 2/2017 | Mani et al. |
| 2017/0083313 | A1* | 3/2017 | Sankaralingam ..... G06F 9/3836 |
| 2017/0123794 | A1 | 5/2017 | Chen et al. |
| 2017/0185564 | A1 | 6/2017 | Toichi et al. |
| 2017/0195173 | A1 | 7/2017 | Izenberg et al. |
| 2017/0244982 | A1 | 8/2017 | Fuldseth et al. |
| 2017/0317678 | A1 | 11/2017 | Coole et al. |
| 2017/0317679 | A1* | 11/2017 | Suh ............ G06F 15/17375 |
| 2017/0322774 | A1 | 11/2017 | Zhang |
| 2017/0322805 | A1 | 11/2017 | Zohar et al. |
| 2018/0121121 | A1 | 5/2018 | Mehra et al. |
| 2018/0157465 | A1 | 6/2018 | Bittner et al. |
| 2018/0157825 | A1 | 6/2018 | Eksten et al. |
| 2018/0174022 | A1 | 6/2018 | Young |
| 2018/0189231 | A1 | 7/2018 | Fleming, Jr. et al. |
| 2018/0220144 | A1 | 8/2018 | Su et al. |
| 2018/0246834 | A1 | 8/2018 | Catiller |
| 2018/0275193 | A1 | 9/2018 | Rouge et al. |
| 2018/0293185 | A1 | 10/2018 | Vembu et al. |
| 2018/0300181 | A1 | 10/2018 | Hetzel et al. |
| 2018/0307950 | A1 | 10/2018 | Nealis et al. |
| 2018/0308200 | A1 | 10/2018 | Surti et al. |
| 2018/0314941 | A1 | 11/2018 | Lie et al. |
| 2018/0315158 | A1 | 11/2018 | Nurvitadhi et al. |
| 2018/0329681 | A1 | 11/2018 | Zhang et al. |
| 2018/0336052 | A1* | 11/2018 | Iyer ............ G06F 9/5005 |
| 2018/0349098 | A1 | 12/2018 | Manohararajah |
| 2019/0004878 | A1* | 1/2019 | Adler ............ G06F 21/629 |
| 2019/0042513 | A1 | 2/2019 | Fleming, Jr. et al. |
| 2019/0042924 | A1 | 2/2019 | Pasca et al. |
| 2019/0087606 | A1* | 3/2019 | Subhaschandra ....... G06F 21/31 |
| 2019/0089616 | A1 | 3/2019 | Chabbi et al. |
| 2019/0114139 | A1 | 4/2019 | Zhang |
| 2019/0138890 | A1 | 5/2019 | Liang et al. |
| 2019/0147323 | A1 | 5/2019 | Li et al. |
| 2019/0171612 | A1 | 6/2019 | Shahar et al. |
| 2019/0180176 | A1 | 6/2019 | Yudanov et al. |
| 2019/0197655 | A1 | 6/2019 | Sun et al. |
| 2019/0205734 | A1 | 7/2019 | Guntoro |
| 2019/0213153 | A1 | 7/2019 | Pan et al. |
| 2019/0258921 | A1 | 8/2019 | Lie et al. |
| 2019/0279075 | A1 | 9/2019 | Liu et al. |
| 2019/0286973 | A1 | 9/2019 | Kovvuri et al. |
| 2019/0317770 | A1 | 10/2019 | Sankaralingam et al. |
| 2020/0090313 | A1 | 3/2020 | Bugdary et al. |
| 2020/0125396 | A1 | 4/2020 | Chynoweth et al. |
| 2020/0151573 | A1 | 5/2020 | Das et al. |
| 2020/0159544 | A1 | 5/2020 | Shah et al. |
| 2020/0159692 | A1 | 5/2020 | Shah et al. |
| 2020/0167309 | A1 | 5/2020 | Nicol |
| 2020/0174840 | A1 | 6/2020 | Zhao et al. |
| 2020/0225996 | A1 | 7/2020 | Sharma et al. |
| 2020/0226444 | A1 | 7/2020 | Sharma et al. |
| 2020/0241844 | A1 | 7/2020 | Koeplinger et al. |
| 2020/0241899 | A1 | 7/2020 | Al-Aghbari et al. |
| 2020/0264876 | A1 | 8/2020 | Lo et al. |
| 2020/0272882 | A1 | 8/2020 | Lo |
| 2020/0310994 | A1 | 10/2020 | ChoFleming et al. |
| 2020/0326992 | A1 | 10/2020 | Jin et al. |
| 2020/0341812 | A1* | 10/2020 | McClure ............ G06F 9/5044 |
| 2020/0341930 | A1 | 10/2020 | Cannata et al. |
| 2020/0356523 | A1 | 11/2020 | Prabhakar et al. |
| 2020/0371805 | A1 | 11/2020 | Lutz et al. |
| 2021/0011770 | A1 | 1/2021 | Prabhakar et al. |
| 2021/0034982 | A1 | 2/2021 | Sather et al. |
| 2021/0042259 | A1 | 2/2021 | Koeplinger et al. |
| 2021/0064341 | A1 | 3/2021 | Kuo et al. |

(56) References Cited

U.S. PATENT DOCUMENTS

| | | | |
|---|---|---|---|
| 2021/0064372 | A1 | 3/2021 | Sun et al. |
| 2021/0064568 | A1 | 3/2021 | Wang et al. |
| 2021/0072955 | A1 | 3/2021 | Mellempudi et al. |
| 2021/0081691 | A1 | 3/2021 | Chen et al. |
| 2021/0081769 | A1 | 3/2021 | Chen et al. |
| 2021/0089343 | A1 | 3/2021 | Hyoudou |
| 2021/0096816 | A1 | 4/2021 | Wang et al. |
| 2021/0097366 | A1 | 4/2021 | Wagner et al. |
| 2021/0097379 | A1 | 4/2021 | Yang et al. |
| 2021/0103820 | A1 | 4/2021 | Ghosh |
| 2021/0110066 | A1* | 4/2021 | Liu ................... G06F 21/72 |
| 2021/0125058 | A1 | 4/2021 | Chowdhury et al. |
| 2021/0149634 | A1 | 5/2021 | Wang et al. |
| 2021/0157550 | A1 | 5/2021 | Wang et al. |
| 2021/0182021 | A1 | 6/2021 | Wang et al. |
| 2021/0192357 | A1 | 6/2021 | Sinha et al. |
| 2021/0192358 | A1 | 6/2021 | Song et al. |
| 2021/0200610 | A1 | 7/2021 | Chu et al. |
| 2021/0241093 | A1 | 8/2021 | Byrne et al. |
| 2021/0263853 | A1 | 8/2021 | Waters et al. |
| 2021/0265015 | A1 | 8/2021 | Parnaby et al. |
| 2022/0100680 | A1 | 3/2022 | Chrysos et al. |
| 2022/0188028 | A1 | 6/2022 | Mesnier et al. |

FOREIGN PATENT DOCUMENTS

| | | | |
|---|---|---|---|
| JP | 2020112901 | A | 7/2020 |
| TW | 200736953 | A | 10/2007 |
| TW | 200801964 | A | 1/2008 |
| TW | 200928736 | A | 7/2009 |
| WO | 2010142987 | A1 | 12/2010 |
| WO | 2018100920 | A1 | 6/2018 |
| WO | 2021067318 | A1 | 4/2021 |
| WO | 2021108328 | A1 | 6/2021 |

OTHER PUBLICATIONS

Olukotun, Designing Computer Sytems for Software 2.0, ISCA 2018 keynote, Jun. 2018, 49 pages.
Paek et al., "Binary Acceleration Using Coarse-Grained Reconfigurable Architecture," ACM SIGARCH Computer Architecture News, vol. 38, No. 4, Sep. 2010, 7 pages.
PCT/US/2021/040382—International Search Report and Written Opinion, dated Nov. 29, 2021, 22 pages.
Petersen, "Softmax with cross-entropy," https://mattpetersen.github.io/softmax-with-cross-entropy, Jun. 25, 2017, 19 pages.
Podobas et al, A Survey on Coarse-Grained Reconfigurable Architectures From a Performance Perspective, IEEEAccess, vol. 2020. 3012084, Jul. 27, 2020, 25 pages.
Prabhakar et al., Plasticine: A Reconfigurable Architecture for Parallel Patterns, ISCA, Jun. 24-28, 2017, 14 pages.
Rubattu et al., Dataflow-Functional High-Level Synthesis for Coarse-Grained Reconfigurable Accelerators, IEEE 2019, pp. 69-72 (Year: 2019).
Ruder, An overview of gradient descent optimization algorithms, NUI Galway Aylien Lyd, dated Jun. 15, 2017, 14 pages.
Strom, Scalable Distributed DNN Training Using Commodity GPU Cloud Computing, Amazon.com, 5 pages.
Tanaka et al., Distributed Deep Learning with GPU-FPGA heterogenous computing, IEEE 2021, 9 pages.
Tanomoto et al., "A CGRA-based Approach for Accelerating Convolutional Neural Networks," 2015 IEEE 9th International Symposium on Embedded Multicore/Many-core Systems-on-Chip, 2015, pp. 73-80.
Tobuschat, et al., "IDAMC: A NoC for mixed criticality systems," 2013 IEEE 19th International Conference on Embedded and Real-Time Computing Systems and Applications, Taipei, Aug. 19-21, 2013, pp. 149-156.
Turkson et al. "Artificial neural network applications in the calibration of spark-ignition engines: An overview," Engineering Science and Technology, an International Journal, vol. 19, Issue 3, Sep. 2016, 1346-1359.
TW 110124802—First Office Action and Search Report dated May 24, 2022, 17 pages.
U.S. Appl. No. 16/922,975—Final Office Action, dated Mar. 9, 2023, 23 pages.
U.S. Appl. No. 16/922,975—Non-Final Office Action, dated Oct. 27, 2022, 26 pages.
U.S. Appl. No. 16/922,975—Notice of Allowance, dated Jul. 3, 2023, 11 pages.
U.S. Appl. No. 17/127,818—Notice of Allowance, dated Jul. 21, 2021, 10 pages.
U.S. Appl. No. 17/127,818—Office Action dated Apr. 1, 2021, 15 pages.
U.S. Appl. No. 17/127,818—Response to Office Action dated Apr. 1, 2021, filed Jul. 1, 2021, 15 pages.
U.S. Appl. No. 17/127,929—Notice of Allowance dated Jul. 21, 2021, 14 pages.
U.S. Appl. No. 17/127,929—Office Action dated Apr. 1, 2021, 26 pages.
U.S. Appl. No. 17/127,929—Response to Office Action dated Apr. 1, 2021, filed Jul. 1, 2021, 10 pages.
U.S. Appl. No. 17/214,768—Notice of Allowance, dated Aug. 11, 2021, 26 pages.
U.S. Appl. No. 17/214,768—Supplemental Notice of Allowance, dated Aug. 25, 2021, 10 pages.
U.S. Appl. No. 17/379,921—Notice of Allowance, dated Nov. 26, 2021, 21 pages.
U.S. Appl. No. 17/379,924—Notice of Allowance, dated Sep. 16, 2021, 23 pages.
Vadivel et al., "Loop Overhead Reduction Techniques for Coarse Grained Reconfigurable Architectures," ResearchGate, Conference Paper, Aug. 2017, https://www.researchgate.net/publication/319416458, 9 pages.
Vranjkovic et al., "Coarse-Grained Reconfigurable Hardware Accelerator of Machine Learning Classifiers," IWSSIP 2016, The 23rd International Conference on Systems, Signals and Image Processing, May 23-25, 2016, Bratislava, Slovakia, 5 pages.
Wang, et al., "Reconfigurable Hardware Accelerators: Opportunities, Trends and Challenges," Cornell University, Dec. 13, 2017, 25 pages.
Wentzlaff et al: "On-Chip Interconnection Architecture of the Tile Processor", IEEE Micro, IEEE Service Center, Los Alamitos, CA, US, vol. 27, No. 5, Sep. 1, 2007 Sep. 1, 2007), pp. 15-31, XP011196754.
What is the difference between model paralellism and data paralellism, Quora, 27 pages. Retrieved on Sep. 3, 2021. Retrieved from [URL: https://www.quora.com/What-is-the-difference-between-model-parallelism-and-data-parallelism ].
Wijtvliet et al., "Coarse Grained Reconfigurable Architectures in the Past 25 Years: Overview and Classification," IEEE 2016, pp. 235-244.
Wijtvliet, Course Syllabus for "Accelerators and Coarse Grained Reconfigurable Architectures," Advanced School for Computing and Imaging, 2017, 2 pages.
Wikipedia "bfloat16 floating-point format," downloaded Aug. 19, 2019, 2 pages.
Wikipedia, Batch normalization, downloaded Feb. 25, 2021, 10 pages.
Wikipedia, Floor and ceiling functions, downloaded Aug. 12, 2019, 5 pages.
Woolloy, NCCL: Accelerated Multi-GPU Collective Communications, NVIDIA, 56 pages.
Xiandong Qi, Introduction to Distributed Deep Learning, dated May 13, 2017, 13 pages.
Zhang et al., Dive into Deep Learning, Release 0.16.2, dated Mar. 20, 2021, 1027 pages.
Zhang, "Design of Coarse-Grained Reconfigurable Architecture for Digital Signal Processing," Implementation Aspects, Master of Science Thesis, Feb. 2009, 110 pages.
80.192.25.230: "Producer-consumer problem", Feb. 7, 2013 {Feb. 7, 2013), XP055530821, Retrieved from the nternet: URL:https://en.wikipedia.org/w/index.php?t>ille=Producer/oE2%80%93consumer_problem&old d=537111527 [retrieved on Dec. 6, 2018], 4 pages.

(56) References Cited

OTHER PUBLICATIONS

Accelerated Computing with a Reconfigurable Dataflow Architecture, SambaNova Systems Whitepaper, 10 pages.
Amba Axi and ACE Protocol Specification, ARM, as early as Jan. 2003, 440 pages.
Ando et al., "A Multithreaded CGRA for Convolutional Neural Network Processing," Scientific Research Publishing, Circuits and Systems, Jun. 2017, pp. 149-170.
Anonymous, Activation Function, Wikipedia, Retrieved on Aug. 16, 2019, 3 pages. Retrieved from [ URL: https://en.wikipedia.org/wiki/Activation_function ].
Arvind, A., Dataflow: Passing the Token, Jun. 6, 2005, 42 pages.
Bae et al., Auto-Tuning CNNs for Coarse-Grained Reconfigurable Array-based Accelerators, IEEE Transactions on Computer-Aided Design of Integrated Circuits and Systems, vol. 37, Issue: 11, Nov. 2018, 10 pages.
Basterretxea et al., "Approximation of sigmoid function and the derivative for hardware implementation of artificial neurons," IEE Proceedings—Circuits, Devices and Systems, vol. 151, Issue 1, Feb. 5, 2004, 7 pages.
Bendersky, The Softmax function and its derivative, Oct. 18, 2016, 11 pages. URL: https://eli.thegreenplace.net/2016/the-softmax-function-and-its-derivative.
Benoit et al., Automatic Task Scheduling/ Loop Unrolling using Dedicated RTR Controllers in Coarse Grain Reconfigurable Architectures, Parallel and Distributed Processing Symposium, 2005. Proceedings. 19th IEEE International Denver, CO, USA Apr. 4-8, 2005, Piscataway, NJ, USA,IEEE, Apr. 4, 2005Apr. 4, 2005), pp. 148a-148a, XP010785667, DOI: 10.1109/IPDPS.2005.119, ISBN: 978-0-7695-2312-5, 8 pages.
Busa et al., A Run-Time Word-Level Reconfigurable Coarse-Grain Functional Unit for a VLIW processor; ACM 2002, pp. 44-49. (Year: 2002).
Cook, Comparing bfloat16 range and precision to other 16-bit numbers, dated Nov. 15, 2018, 8 pages. Retrieved on Dec. 3, 2021. Retrieved from the internet [URL: www.johndcook.com/blog/2018/11/15/bfloat16 ].
De Sutter et al., Coarse-Grained Reconfigurable Array Architectures, 2010 Handbook of Signal Processing Systems, 37 pages.
Dettmers, How to Parallelize Deep Learning on GPUs Part 1 of 2: Data Parallelism, dated Oct. 9, 2014, 19 pages. Retrieved on Sep. 3, 2021 Retrieved from [URL: https://timdettmers.com/2014/10/09/deep-learning-data-parallelism/].
Dettmers, How to Parallelize Deep Learning on GPUs Part 2 of 2: Model Parallelism, dated Nov. 9, 2014, 19 pages. Retrieved on Sep. 3, 2021. Retrieved from [URL: https://timdettmers.com/2014/11/09/model-parallelism-deep-learning/ ].
Donges, Gradient Descent: An Introduction to Machine Learning's Most Popular Algorithms, dated Jun. 16, 2019, 10 pages. Retrieved on Mar. 24, 2021, retrieved from [URL: https://builtin.com/data-science/gradient-descent ].
Ekanayake, Model Parallelism in Deep Learning is NOT What you think, dated Nov. 10, 2018, 4 pages. Retrieved an Sep. 3, 2021. Retrieved from [ URL: https://medium.com/@esaliya/model-parallelism-in-deep-learning-is-not-what-you-think-94d2f81e82ed ].
Eppler et al., High speed neural network chip for trigger purposes in high energy physics, IEEE, Proc. of the conference on design, automation and test in Europe, Feb. 1998, 8 pages.
Éricles Sousa, A reconfigurable memory architecture for system integration of coarse-grained reconfigurable arrays, Published in: 2017 International Conference on ReConFigurable Computing and FPGAs (ReConFig) Dec. 4-6, 2017 https://ieeexplore.IEEE.org/document/8279768 (Year: 2017).
Fiolhais et al., "Overlay Architectures for Space Applications," SpacE FPGA Users Workshop, Apr. 9-11, 2018, pp. 1-20.
Gomar et al. "Precise digital implementations of hyperbolic tanh and sigmoid function," 2016 50th Asilomar Conference on Signals, Systems and Computers, Nov. 6-9, 2016, 4 pages.
Goodfellow et. al., Deep Learning Book Chapter 6 Deep Feedforward Networks, 2016, 60 pages.
Harris et al., Architectures and Algorithms for User Customization of CNNs, ASP-DAC 2018, 32 pages.
Hartenstein, Coarse Grain Reconfigurable Architectures, IEEE, 2001, 6 pages.
Iannucci, "Toward a dataflow/von Neumann hybrid architecture," ISCA '88 Proc. of the 15th Annual ISCA, May 30-Jun. 2, 1988, 10 pages.
Insujang, GPU Architecture Overview, Better Tomorrow with Computer Science, published Apr. 27, 2017, retrieved on Jun. 17, 2021, retrieved from the Internet [ URL: https://insujang.github.io/2017-04-17/gpu-architecture-overview/].
Intel BLOAT16—Hardware Numerics Definition White Paper, Rev. 1.0, Nov. 2018, 7 pages.
Ioffe, et al., "Batch Normalization: Accelerating Deep Network Training by Reducing Internal Covariate Shift," Cornell University, available at https://arxiv.org/abs/1502.03167, Mar. 2, 2015, 11 pages.
Iqbal et al., Reconfigurable Processor Architecture for High Speed Applications, IEEE, dated 2009, pp. 624-629.
Jafri et al., NeuroCGRA: A CGRAs with Support for Neural Networks, 2014 International Conference on High Performance Computing & Simulation (HPCS), 8 pages.
Jin et al., How to scale distributed deep learning, dated Nov. 14, 2016, 16 pages.
Kachris et al.; "A Survey on Reconfigurable Accelerators for Cloud Computing", IEEE 2016, Aug. 29, 2016, pp. 1-11.
Knodel, Oliver, et al., "RC3E: Reconfigurable Accelerators in Data Centers and their Provision by Adapted Service Models", IEEE 9th International Converence on Cloud Computing, 2016, pp. 1-8.
Koeplinger et al., Spatial: A Language and Compiler for Application Accelerators, PLDI '18, Jun. 18-22, 2018, Association for Computng Machinery, 16 pages.
Lecture 11: Distributed Training and Communication Protocols, CSE599W: Spring 2018, UW Paul G. Allen School of Computer Science and Engineering, 41 pages.
Li, Ang, et al., "Evaluating Modern GPU Interconnect: PCIe, NVLink, NV-SLI, NVSwitch and GPUDirect", Mar. 11, 2019, 15 pages.
Li, et al., "CATERPILLAR: Coarse Grain Reconfigurable Architecture for Accelerating the Training of Deep Neural Networks," arXiv: 1706.00517v2 [cs.DC], Jun. 8, 2017, 10 pages.
Lin et al., "A Digital Circuit Design of Hyperbolic Tangent Sigmoid Function for Neural Networks," 2018 IEEE Int'l Symp. on Circuits and Systems, May 18-21, 2018, 4 pages.
Liu et al., Offloading distributed Applications onto SmartNICs using iPipe, ACM 2019, pp. 1-16.
M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].
Ma et al., DeepGauge: Multi-Granularity Testing Criteria for Deep Learning Systems; ACM 2018, pp. 1-12.
Mao, Data Parallelism vs Model Parallelism in Distributed Deep Learning Training, dated Mar. 23, 2019, 4 pages, retrieved on Mar. 30, 2021, Retrieved from the internet [ URL: https://leimao.github.io].
Marshall, Dave, "Remote Procedure Calls (RPC)", Jan. 5, 1999, 15 pages, Retreived from URL.
Mazur, A step by step backpropagation example, dated Mar. 17, 2015, 26 pages. Retrieved on Sep. 3, 2021. Retrieved from [URL: https://mattmazur.com/2015/03/17/a-step-by-step-backpropagation-example/ ].
MISB ST 1201.4, "Floating Point to Integer Mapping," Feb. 28, 2019, pp. 1-21.
Nicol, "A Course Grain Reconfigurable Array (CGRA) for Statically Scheduled Data Flow Computing," Wave Computing, May 3, 2017, 9 pages.
Nicol, "Wave Computing: A Dataflow Processing Chip for Training Deep Neural Networks," 2017, 25 pages.
NVIDIA, "NVIDIA DGX-1 System Architecture", WP-08437-001_v02, 2017, 33 pages.
NVIDIA, "NVIDIA DGX-1 With Tesla V100 System Architecture", WP-08437-002_v01, 2017, 43 pages.

(56) References Cited

OTHER PUBLICATIONS

NVIDIA, "NVIDIA Tesla P100", WP-08019-001 v01.1, 2016, 45 pages.

\* cited by examiner

RUNTIME VIRTUALIZATION OF RECONFIGURABLE DATA FLOW RESOURCES

CROSS-REFERENCE TO RELATED APPLICATIONS

This application is a Divisional application of U.S. patent application Ser. No. 16/922,975, entitled, "Runtime Virtualization of Reconfigurable Data Flow Resources" filed on 7 Jul. 2020, which is incorporated by reference herein for all purposes.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The 39th ACM SIGPLAN Conference On Programming Language Design And Embodiment* (PLDI), Proceedings of the 43rd International Symposium on Computer Architecture, 2018;

U.S. Nonprovisional patent application Ser. No. 16/239,252, now U.S. Pat. No. 10,698,853 B1, filed Jan. 3, 2019, entitled, "VIRTUALIZATION OF A RECONFIGURABLE DATA PROCESSOR;"

U.S. Nonprovisional patent application Ser. No. 16/197,826, now U.S. Pat. No. 10,831,507 B2, filed Nov. 21, 2018, entitled, "CONFIGURATION LOAD OF A RECONFIGURABLE DATA PROCESSOR;"

U.S. Nonprovisional patent application Ser. No. 16/198,086, now U.S. Pat. No. 11,188,497 B2, filed Nov. 21, 2018, entitled, "CONFIGURATION UNLOAD OF A RECONFIGURABLE DATA PROCESSOR;"

U.S. Nonprovisional patent application Ser. No. 16/260,548, now U.S. Pat. No. 10,768,899 B2, filed Jan. 29, 2019, entitled, "MATRIX NORMAL/TRANSPOSE READ AND A RECONFIGURABLE DATA PROCESSOR INCLUDING SAME;"

U.S. Nonprovisional patent application Ser. No. 16/536,192, now U.S. Pat. No. 11,080,227 B2, filed Aug. 8, 2019, entitled, "COMPILER FLOW LOGIC FOR RECONFIGURABLE ARCHITECTURES;"

U.S. Nonprovisional patent application Ser. No. 16/407,675, now U.S. Pat. No. 11,386,038 B2, filed May 9, 2019, entitled, "CONTROL FLOW BARRIER AND RECONFIGURABLE DATA PROCESSOR;"

U.S. Nonprovisional patent application Ser. No. 16/504,627, now U.S. Pat. No. 11,055,141 B2, filed Jul. 8, 2019, entitled, "QUIESCE RECONFIGURABLE DATA PROCESSOR;"

U.S. Nonprovisional patent application Ser. No. 16/572,516, filed Sep. 16, 2019, entitled, "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744,077, filed Jan. 15, 2020, entitled, "COMPUTATIONALLY EFFICIENT SOFTMAX LOSS GRADIENT BACKPROPAGATION;"

U.S. Nonprovisional patent application Ser. No. 16/590,058, now U.S. Pat. No. 11,327,713 B2, filed Oct. 1, 2019, entitled, "COMPUTATION UNITS FOR FUNCTIONS BASED ON LOOKUP TABLES;"

U.S. Nonprovisional patent application Ser. No. 16/695,138, now U.S. Pat. No. 11,328,038 B2, filed Nov. 25, 2019, entitled, "COMPUTATION UNITS FOR BATCH NORMALIZATION;"

U.S. Nonprovisional patent application Ser. No. 16/688,069, now U.S. Pat. No. 11,327,717 B2, filed Nov. 19, 2019, entitled, "LOOK-UP TABLE WITH INPUT OFFSETTING;"

U.S. Nonprovisional patent application Ser. No. 16/718,094, now U.S. Pat. No. 11,150,872 B2, filed Dec. 17, 2019, entitled, "COMPUTATION UNITS FOR ELEMENT APPROXIMATION;"

U.S. Nonprovisional patent application Ser. No. 16/560,057, now U.S. Pat. No. 11,327,923 B2, filed Sep. 4, 2019, entitled, "SIGMOID FUNCTION IN HARDWARE AND A RECONFIGURABLE DATA PROCESSOR INCLUDING SAME;"

U.S. Nonprovisional patent application Ser. No. 16/572,527, now U.S. Pat. No. 11,410,027 B2, filed Sep. 16, 2019, entitled, "PERFORMANCE ESTIMATION-BASED RESOURCE ALLOCATION FOR RECONFIGURABLE ARCHITECTURES;"

U.S. Nonprovisional patent application Ser. No. 15/930,381, now U.S. Pat. No. 11,250,105 B2, filed May 12, 2020, entitled, "COMPUTATIONALLY EFFICIENT GENERAL MATRIX-MATRIX MULTIPLICATION (GeMM);" and U.S. Nonprovisional patent application Ser. No. 16/890,841, filed Jun. 2, 2020, entitled, "ANTI-CONGESTION FLOW CONTROL FOR RECONFIGURABLE PROCESSORS."

FIELD OF THE TECHNOLOGY DISCLOSED

The present technology relates to runtime virtualization of reconfigurable architectures, which can be particularly applied to cloud offering of coarse-grained reconfigurable architectures (CGRAs).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Virtualization has enabled the efficient scaling and sharing of compute resources in the cloud, adapting to changing user needs at runtime. Users are offered a view of an application service with management of resources hidden from view, or alternatively abstracted development platforms for deploying applications that can adapt to changing needs. The flexibility, scalability, and affordability offered by cloud computing are fundamental to the massively connected compute paradigm of the future. However, virtualization of resources, complex communication, and fluctuations in computational demands can make running complex applications challenging. And, as the performance of server class processors has stuttered, alternative strategies for scaling performance are being explored.

Applications are migrating to the cloud in search of scalability, resilience, and cost-efficiency. At the same time, silicon scaling has stalled, precipitating a wave of new specialized hardware accelerators such as tensor processing units (TPUs) and intelligence processing units (IPUs), and on-demand graphics processing unit (GPU) and field programmable gate arrays (FPGA) support from cloud providers. Accelerators have driven the success of emerging application domains in the cloud, but cloud computing and hardware specialization are on a collision course. Cloud applications run on virtual infrastructure, but practical virtualization support for accelerators has yet to arrive. Cloud providers routinely support accelerators but do so using peripheral component interconnect express (PCIe) passthrough techniques that dedicate physical hardware to virtual machines (VMs). Multi-tenancy and consolidation are lost as a consequence, which leads to hardware underutilization.

The problem is increasingly urgent, as runtime systems have not kept pace with accelerator innovation. Specialized hardware and frameworks emerge far faster than the runtime systems support them, and the gap is widening. Runtime-driven accelerator virtualization requires substantial engineering effort and the design space features multiple fundamental tradeoffs for which a sweet spot has remained elusive.

Practical virtualization must support sharing and isolation under flexible policy with minimal overhead. The structure of accelerator stacks makes this combination extremely difficult to achieve. Accelerator stacks are silos comprising proprietary layers communicating through memory mapped interfaces. This opaque organization makes it impractical to interpose intermediate layers to form an efficient and compatible virtualization boundary. The remaining interposable interfaces leave designers with untenable alternatives that sacrifice critical virtualization properties such as interposition and compatibility.

Reconfigurable processors have emerged as a contender for cloud accelerators, combining significant computational capabilities with an architecture more amenable to virtualization, and a lower power footprint. A key strength of reconfigurable processors is the ability to modify their operation at runtime, as well as the ease with which they can be safely partitioned for sharing. Reconfigurable processors, including FPGAs, can be configured to implement a variety of functions more efficiently or faster than might be achieved using a general purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

Reconfigurable processors provide low-latency and energy-efficient solutions for deep neural network inference applications. However, as deep learning accelerators, reconfigurable processors are optimized to provide high performance for single-task and static-workload scenarios, which conflict with the multi-tenancy and dynamic resource allocation requirements of cloud computing.

It is desirable therefore to provide virtualized reconfigurable processors that support multi-client and dynamic-workload scenarios in the cloud. Runtime support for better virtualization of reconfigurable processors is needed.

SUMMARY

A technology is described which enables runtime virtualization of Coarse-Grained Reconfigurable Array processors that contain programmable elements in an array partitionable into subarrays, and other types of reconfigurable processors.

A data processing system is described that comprises a pool of reconfigurable data flow resources. Reconfigurable data flow resources in the pool of reconfigurable data flow resources include arrays of physical configurable units and memory. A runtime processor is operatively coupled to the pool of reconfigurable data flow resources. The runtime processor includes logic to receive a plurality of configuration files for user applications. A compiler generates the configuration files and sends the configuration files to the runtime processor via an application programming interface. Configuration files in the plurality of configuration files include configurations of virtual data flow resources required to execute the user applications.

The runtime processor also includes logic to allocate physical configurable units and memory in the pool of reconfigurable data flow resources to the virtual data flow resources, and to load the configuration files to the allocated physical configurable units. The runtime processor further includes logic to execute the user applications using the allocated physical configurable units and memory. The runtime processor includes logic to return the allocated physical configurable units and memory for an executed user application to the pool of reconfigurable data flow resources for reallocation to another user application.

The configurations of virtual data flow resources specify one or more arrays in the arrays of physical configurable units required to execute the user applications. In some implementations, the configurations of virtual data flow resources specify one or more subarrays of the one or more arrays. The configurations of virtual data flow resources specify topology of the one or more subarrays of the one or more arrays.

The reconfigurable data flow resources include bus interfaces. The bus interfaces include peripheral component interconnect express (PCIe) channels, direct memory access (DMA) channels, and double data rate (DDR) channels, and network access channels such as InfiniBand and Ethernet channels. The memory includes main memory, local secondary storage, and remote secondary storage.

The configurations of virtual data flow resources specify virtual memory segments for the reconfigurable data flow resources, including virtual address spaces of the virtual memory segments and sizes of the virtual address spaces. The runtime processor maps the virtual address spaces of the virtual memory segments to physical address spaces of physical memory segments in the memory.

The runtime processor configures control and status registers of the reconfigurable data flow resources with configuration data identifying the mapping between the virtual address spaces and the physical address spaces for the configuration files to access the physical memory segments during execution of the user applications. A first set of the physical memory segments mapped to a first set of the reconfigurable data flow resources allocated to a first user application are different from a second set of the physical memory segments mapped to a second set of the reconfigurable data flow resources allocated to a second user application. Also, access of the first set of the reconfigurable data flow resources is confined to the first set of the physical memory segments, and access of the second set of the reconfigurable data flow resources is confined to the second set of the physical memory segments.

The runtime processor runs in a host processor that is operatively coupled to the pool of reconfigurable data flow resources. The runtime processor includes a runtime library that runs in a userspace of the host processor and a kernel module that runs in a kernelspace of the host processor. The kernel module includes a resource manager and a driver.

The runtime library passes a file descriptor identifying the configurations of virtual data flow resources to the kernel module using an input-output control (IOCTL) system call. The resource manager uses the file descriptor to allocate the reconfigurable data flow resources to the virtual data flow resources. The resource manager returns a context structure identifying the allocated reconfigurable data flow resources to the runtime library.

The runtime library is configured with logic to execute a configuration load process that includes generating a dynamic state profile based on the configurations of virtual data flow resources and progressively traversing states of the dynamic state profile. The states include at least one of loading the configuration files, loading arguments modifying the configuration files, loading virtual memory segments supporting the configuration files, beginning execution of the configuration files, pausing, and resuming execution of the configuration files, and unloading the configurations files after execution. The driver loads the configuration files to the allocated reconfigurable data flow resources.

The pool of reconfigurable data flow resources is a node with a plurality of reconfigurable data flow resources. In one implementation, the pool of reconfigurable data flow resources is a rack with a plurality of nodes. Each node in the plurality of nodes has a plurality of reconfigurable data flow resources and a runtime processor that provides unified interface to the pool of reconfigurable data flow resources. In another implementation, the pool of reconfigurable data flow resources is a pod with a plurality of racks. Each rack in the plurality of racks has a plurality of nodes. Each node in the plurality of nodes has a plurality of reconfigurable data flow resources and a runtime processor that provides unified interface to the pool of reconfigurable data flow resources.

In yet another implementation, the pool of reconfigurable data flow resources is a superpod with a plurality of pods. Each pod in the plurality of pods has a plurality of racks. Each rack in the plurality of racks has a plurality of nodes. Each node in the plurality of nodes has a plurality of reconfigurable data flow resources and a runtime processor that provides unified interface to the pool of reconfigurable data flow resources.

In yet another implementation, the pool of reconfigurable data flow resources is a zone with a plurality of superpods. Each superpod in the plurality of superpods has a plurality of pods. Each pod in the plurality of pods has a plurality of racks. Each rack in the plurality of racks has a plurality of nodes. Each node in the plurality of nodes has a plurality of reconfigurable data flow resources and a runtime processor that provides unified interface to the pool of reconfigurable data flow resources.

In yet further implementation, the pool of reconfigurable data flow resources is a datacenter with a plurality of zones. Each zone in the plurality of zones has a plurality of superpods. Each superpod in the plurality of superpods has a plurality of pods. Each pod in the plurality of pods has a plurality of racks. Each rack in the plurality of racks has a plurality of nodes. Each node in the plurality of nodes has a plurality of reconfigurable data flow resources and a runtime processor that provides unified interface to the pool of reconfigurable data flow resources.

A system is described that comprises a plurality of reconfigurable devices, a plurality of transfer resources, a plurality of storage resources, and a runtime processor. Reconfigurable devices in the plurality of reconfigurable devices include a plurality of reconfigurable processors. Reconfigurable processors in the plurality of reconfigurable processors include an array of configurable units. The array of configurable units is partitionable into a plurality of subarrays of configurable units.

The plurality of transfer resources is usable by the reconfigurable devices to receive and send data. The plurality of storage resources is usable by the reconfigurable devices to store data.

A runtime processor is configured with logic to present a unified interface to the plurality of reconfigurable devices, the plurality of transfer resources, and the plurality of storage resources. The runtime processor is also configured with logic to control execution of a plurality of application graphs based on an execution file. A compiler generates the execution file. The execution file includes configuration files for application graphs in the plurality of application graphs, topologies of subarrays of configurable units in the plurality of subarrays of configurable units required to load and execute the configuration files, and resource requests for transfer resources in the plurality of transfer resources and storage resources in the plurality of storage resources required to satisfy data and control dependencies of the application graphs.

The transfer resources include peripheral component interconnect express (PCIe) channels, direct memory access (DMA) channels, and double data rate (DDR) channels, and network access channels such as InfiniBand and Ethernet channels. The storage resources include level 1 cache, level 2 cache, and level 3 cache. The storage resources include main memory, local secondary storage, and remote secondary storage.

The runtime processor is also configured with logic to allocate the subarrays of configurable units to the application graphs based on the topologies, allocate the transfer resources and the storage resources to the application graphs based on the resource requests, and load and execute the configuration files using the allocated subarrays of configurable units, transfer resources, and storage resources.

The topologies specify a set of subarrays of configurable units of a single reconfigurable processor along a vertical and horizontal orientation. The topologies specify a set of subarrays of configurable units spanning two or more reconfigurable processors.

The runtime processor allocates one or more subarrays of configurable units of a single reconfigurable processor to two or more configuration files of two or more application graphs based on the topologies. The device driver concurrently loads and executes the two or more configuration files on the subarrays of the single reconfigurable processor.

The runtime processor allocates subarrays of two or more reconfigurable processors to a single configuration file of a single application graph based on the topologies. The device driver concurrently loads and executes the single configuration file on the subarrays of the two or more reconfigurable processors.

A data processing system is described that comprises a plurality of integrated circuits, a runtime processor, and a single device driver. Integrated circuits in the plurality of integrated circuits include arrays of physical configurable units and having access to memory. The runtime processor is configured to receive a configuration file for a user application. The configuration file specifies virtual resources required to execute the user application. The virtual resources span two or more of the integrated circuits.

The single device driver is operatively coupled to the plurality of integrated circuits. The device driver includes logic to allocate, to the virtual resources in the configuration file, physical configurable units and memory across the two or more of the integrated circuits, and load the configuration file to the allocated physical configurable units, and to execute the user application using the allocated physical configurable units and memory.

A system is described that comprises a plurality of integrated circuits and a common device driver. The common device driver executes in kernelspace of a host processor operatively coupled to the plurality of integrated circuits, and is configured to present integrated circuits in the plurality of integrated circuits as a single virtual integrated circuit to user applications executing in userspace of the host processor and requesting execution. The common device driver is configured to control execution of the user applications across the integrated circuits.

A computer-implemented method is described that includes receiving a plurality of configuration files for user applications, configuration files in the plurality of configuration files including configurations of virtual data flow resources required to execute the user applications; allocating physical configurable units and memory in a pool of reconfigurable data flow resources to the virtual data flow resources, and loading the configuration files to the allocated physical configurable units; and executing the user applications using the allocated physical configurable units and memory.

A computer-implemented method is described that includes presenting a unified interface to a plurality of reconfigurable devices, a plurality of transfer resources, and a plurality of storage resources, reconfigurable devices in the plurality of reconfigurable devices including a plurality of reconfigurable processors, reconfigurable processors in the plurality of reconfigurable processors including an array of configurable units, the array of configurable units partitionable into a plurality of subarrays of configurable units, transfer resources in the plurality of transfer resources usable by the reconfigurable devices to receive and send data, and storage resources in the plurality of storage resources usable by the reconfigurable devices to store data; controlling execution of a plurality of application graphs based on an execution file, the execution file including configuration files for application graphs in the plurality of application graphs, topologies of subarrays of configurable units in the plurality of subarrays of configurable units required to load and execute the configuration files, and resource requests for transfer resources in the plurality of transfer resources and storage resources in the plurality of storage resources required to satisfy data and control dependencies of the application graphs; allocating the subarrays of configurable units to the application graphs based on the topologies; allocating the transfer resources and the storage resources to the application graphs based on the resource requests; and loading and executing the configuration files using the allocated subarrays of configurable units, transfer resources, and storage resources.

A computer-implemented method is described that includes receiving a configuration file for a user application, the configuration file specifying virtual resources required to execute the user application, the virtual resources spanning two or more integrated circuits in a plurality of integrated circuits, and the integrated circuits in the plurality of integrated circuits including arrays of physical configurable units and having access to memory; and using a single device driver operatively coupled to the plurality of integrated circuits to allocate, to the virtual resources in the configuration file, physical configurable units and memory across the two or more of the integrated circuits, to load the configuration file to the allocated physical configurable units, and to execute the user application.

A computer-implemented method is described that includes using a common device driver, executing in kernelspace of a host processor operatively coupled to a plurality of integrated circuits, to present integrated circuits in the plurality of integrated circuits as a single virtual integrated circuit to user applications executing in userspace of the host processor and requesting execution. The common device driver is configured to control execution of the user applications across the integrated circuits.

A non-transitory computer readable storage medium impressed with computer program instructions is described. The instructions, when executed on a processor, implement a method comprising receiving a plurality of configuration files for user applications, configuration files in the plurality of configuration files including configurations of virtual data flow resources required to execute the user applications; allocating physical configurable units and memory in a pool of reconfigurable data flow resources to the virtual data flow resources, and loading the configuration files to the allocated physical configurable units; and executing the user applications using the allocated physical configurable units and memory.

A non-transitory computer readable storage medium impressed with computer program instructions is described. The instructions, when executed on a processor, implement a method comprising presenting a unified interface to a plurality of reconfigurable devices, a plurality of transfer resources, and a plurality of storage resources, reconfigurable devices in the plurality of reconfigurable devices including a plurality of reconfigurable processors, reconfigurable processors in the plurality of reconfigurable processors including an array of configurable units, the array of configurable units partitionable into a plurality of subarrays of configurable units, transfer resources in the plurality of transfer resources usable by the reconfigurable devices to receive and send data, and storage resources in the plurality of storage resources usable by the reconfigurable devices to store data; controlling execution of a plurality of application graphs based on an execution file, the execution file including configuration files for application graphs in the plurality of application graphs, topologies of subarrays of configurable units in the plurality of subarrays of configurable units required to load and execute the configuration files, and resource requests for transfer resources in the plurality of transfer resources and storage resources in the plurality of storage resources required to satisfy data and control dependencies of the application graphs; allocating the subarrays of configurable units to the application graphs based on the topologies; allocating the transfer resources and the storage resources to the application graphs based on the resource requests; and loading and executing the configuration files using the allocated subarrays of configurable units, transfer resources, and storage resources.

A non-transitory computer readable storage medium impressed with computer program instructions is described. The instructions, when executed on a processor, implement a method comprising receiving a configuration file for a user application, the configuration file specifying virtual resources required to execute the user application, the virtual resources spanning two or more integrated circuits in a plurality of integrated circuits, and the integrated circuits in the plurality of integrated circuits including arrays of physical configurable units and having access to memory; and using a single device driver operatively coupled to the plurality of integrated circuits to allocate, to the virtual resources in the configuration file, physical configurable units and memory across the two or more of the integrated circuits, to load the configuration file to the allocated physical configurable units, and to execute the user application.

A non-transitory computer readable storage medium impressed with computer program instructions is described. The instructions, when executed on a processor, implement a method comprising using a common device driver, executing in kernelspace of a host processor operatively coupled to a plurality of integrated circuits, to present integrated circuits in the plurality of integrated circuits as a single virtual integrated circuit to user applications executing in userspace of the host processor and requesting execution. The common device driver is configured to control execution of the user applications across the integrated circuits.

Other aspects and advantages of the technology described herein can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Figure 1:
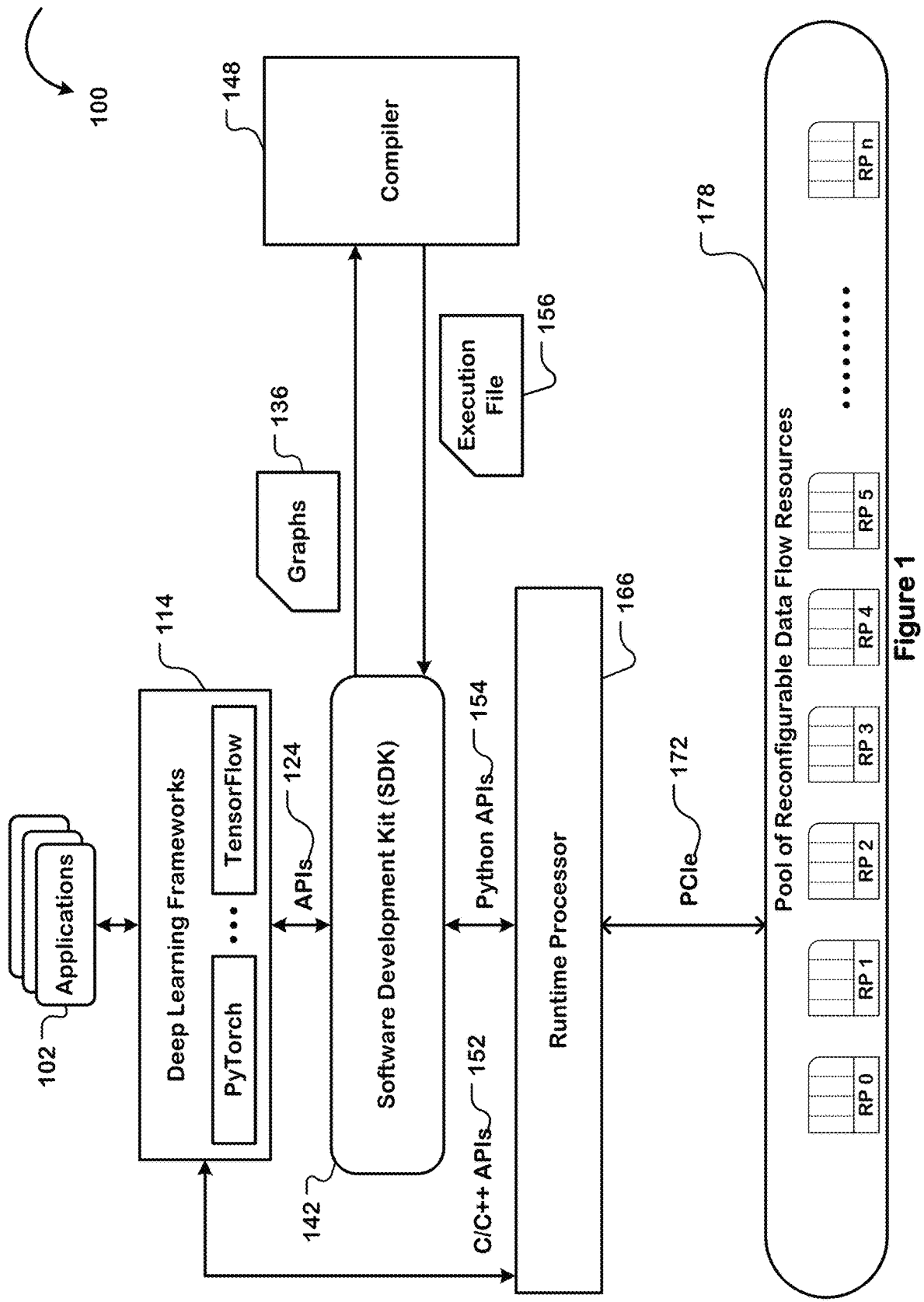
FIG. 1 shows a compute environment in which applications are provided a unified interface to a pool of reconfigurable data flow resources by the technology disclosed, which makes the pool of reconfigurable data flow resources available to the applications as a single reconfigurable processor.

FIG. 1 shows a compute environment 100 that provides on-demand network access to a pool of reconfigurable data flow resources 178 that can be rapidly provisioned and released with minimal management effort or service provider interaction. Reconfigurable data flow resources in the pool of reconfigurable data flow resources 178 include reconfigurable processors. A reconfigurable processor includes an array of configurable units (e.g., compute units and memory units) in a programmable interconnect fabric. The array of configurable units in a reconfigurable processor is partitionable into a plurality of subarrays (or tiles) of configurable units. Additional details about the architecture of the reconfigurable processors are discussed later in using FIGS. 16, 17, 18A, 18B, 19, and 20.

The pool of reconfigurable data flow resources 178 also includes bus (or transfer) resources. Examples of the bus resources include PCIe channels, DMA channels, and DDR channels. The pool of reconfigurable data flow resources 178 also includes memory (or storage) resources. Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable data flow resources 178 is dynamically scalable to meet the performance objectives required by applications 102 (or user applications 102). The applications 102 access the pool of reconfigurable data flow resources 178 over one or more networks (e.g., Internet).

Figure 10:
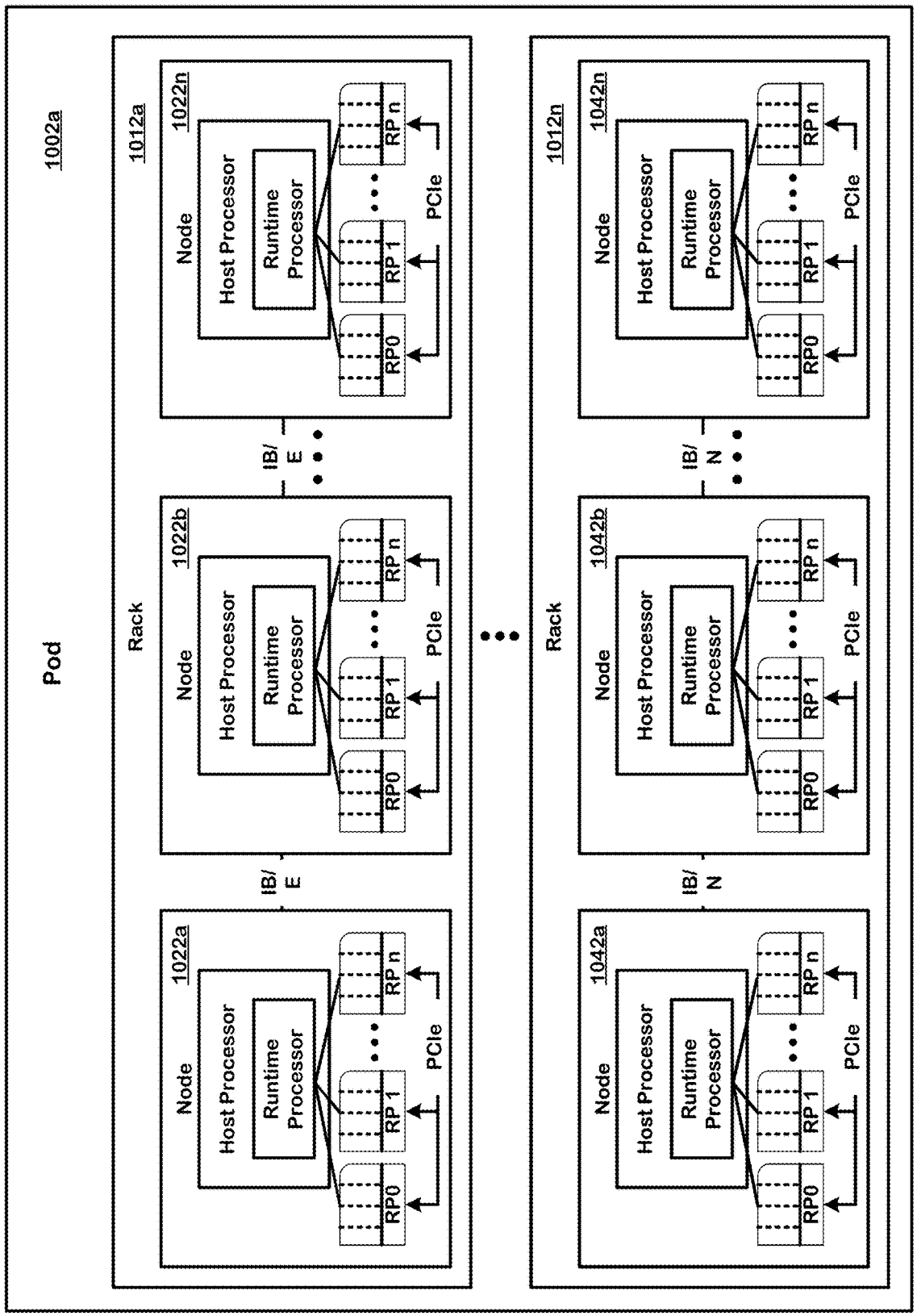
FIG. 10 shows different compute scales and hierarchies that form the pool of reconfigurable data flow resources according to the technology disclosed.

FIG. 10 shows different compute scales and hierarchies that form the pool of reconfigurable data flow resources 178 according to different implementations of the technology disclosed. In one example, the pool of reconfigurable data flow resources 178 is a node (or a single machine) that runs a plurality of reconfigurable processors, supported by required bus and memory resources. The node also includes a host processor (e.g., CPU) that exchanges data with the plurality of reconfigurable processors, for example, over a PCIe interface. The host processor includes a runtime processor that manages resource allocation, memory mapping, and execution of the configuration files for applications requesting execution from the host processor. In another example, the pool of reconfigurable data flow resources 178 is a rack (or cluster) (e.g., 1012a, . . . , 1032n) of nodes (e.g., 1022a, 1022b, . . . , 1022n, 1032a, 1032b, . . . , 1032n), such that each node in the rack runs a respective plurality of reconfigurable processors, and includes a respective host processor configured with a respective runtime processor. The runtime processors are distributed across the nodes and communicate with each other so that they have unified access to the reconfigurable processors attached not just to their own node on which they run, but also to the reconfigurable processors attached to every other node in the data center.

The nodes in the rack are connected, for example, over Ethernet or InfiniBand (IB). In yet another example, the pool of reconfigurable data flow resources 178 is a pod (e.g., 1002a) that comprises a plurality of racks. In yet another example, the pool of reconfigurable data flow resources 178 is a superpod that comprises a plurality of pods. In yet another example, the pool of reconfigurable data flow resources 178 is a zone that comprises a plurality of superpods. In yet another example, the pool of reconfigurable data flow resources 178 is a data center that comprises a plurality of zones.

The applications 102 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produce outputs that are written to one or more output buffers. The structure of these pipelines depends on the control and dataflow graph representing the application. Pipelines can be arbitrarily nested and looped within each other.

The applications 102 comprise high-level programs. A high-level program is source code written in programming languages like C, C++, Java, JavaScript, Python, and Spatial, for example, using deep learning frameworks 114 like PyTorch, TensorFlow, ONNX, Caffe, and Keras. The high-level program can implement computing structures and algorithms of machine learning models like AlexNet, VGG Net, GoogleNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

Regarding loops in the high-level programs of the applications 102, loops directly nested in a loop body are termed the child loops of the outer parent loop. A loop is called an innermost loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

Software development kit (SDK) 142 generates computation graphs (e.g., data flow graphs, control graphs) 136 of the high-level programs of the applications 102. The SDK 142 transforms the input behavioral description of the high-level programs into an intermediate representation such as the computation graphs 136. This may include code optimization steps like false data dependency elimination, dead-code elimination, and constant folding. The computation graphs 136 encode the data and control dependencies of the high-level programs.

The computation graphs 136 comprise nodes and edges. The nodes can represent compute operations and memory allocations. The edges can represent data flow and flow control. In some implementations, each loop in the high-level programs can be represented as a "controller" in the computation graphs 136. The computation graphs 136 support branches, loops, function calls, and other variations of control dependencies. In some implementations, after the computation graphs 136 are generated, additional analyses or optimizations focused on loop transformations can be performed, such as loop unrolling, loop pipelining, loop fission/fusion, and loop tiling.

The SDK 142 also supports programming the reconfigurable processors in the pool of reconfigurable data flow resources 178 at multiple levels, for example, from the high-level deep learning frameworks 114 to C++ and assembly language. In some implementations, the SDK 142 allows programmers to develop code that runs directly on the reconfigurable processors. In other implementations, the SDK 142 provides libraries that contain predefined functions like linear algebra operations, element-wise tensor operations, non-linearities, and reductions required for creating, executing, and profiling the computation graphs 136 on the reconfigurable processors. The SDK 142 communicates with the deep learning frameworks 114 via APIs 124.

A compiler 148 transforms the computation graphs 136 into a hardware-specific configuration, which is specified in an execution file 156 generated by the compiler 148. In one implementation, the compiler 148 partitions the computation graphs 136 into memory allocations and execution fragments, and these partitions are specified in the execution file 156. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the computation graphs 136 into the execution fragments includes treating calculations within at least one innermost loop of a nested loop of the computation graphs 136 as a separate execution fragment. In other implementations, the partitioning of the computation graphs 136 into the execution fragments includes treating calculations of an outer loop around the innermost loop of the computation graphs 136 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the computation graphs 136, and these memory allocations are specified in the execution file 156. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compiler 148 binds memory allocations to virtual memory units and binds execution fragments to virtual compute units, and these bindings are specified in the execution file 156. In some implementations, the compiler 148 partitions execution fragments into memory fragments and compute fragments, and these partitions are specified in the execution file 156. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compiler 148 performs the partitioning using reverse dataflow analysis such that inputs to an address used in a memory access are recursively flagged until the compiler 148 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compiler 148 assigns the memory fragments to the virtual memory units and assigns the compute fragments to the virtual compute units, and these assignments are specified in the execution file 156. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compiler 148 allocates the virtual memory units to physical memory units of a reconfigurable processor (e.g., pattern memory units (PMUs) of the reconfigurable processor) and allocates the virtual compute units to physical compute units of the reconfigurable processor (e.g., pattern compute units (PCUs) of the reconfigurable processor), and these allocations are specified in the execution file 156. The compiler 148 places the physical memory units and the physical compute units onto positions in an array of configurable units of the reconfigurable processor and routes data and control networks between the placed positions, and these placements and routes are specified in the execution file 156. In one implementation, this includes allocating physical resources such as counters and registers within each physical memory and compute unit, and these allocations are specified in the execution file 156.

The compiler 148 translates the applications 102 developed with commonly used open-source packages such as Keras and PyTorch into reconfigurable processor specifications. The compiler 148 generates the configuration files with configuration data for the placed positions and the routed data and control networks. In one implementation, this includes assigning coordinates and communication resources of the physical memory and compute units by placing and routing units onto the array of the processor while maximizing bandwidth and minimizing latency.

Figure 2:
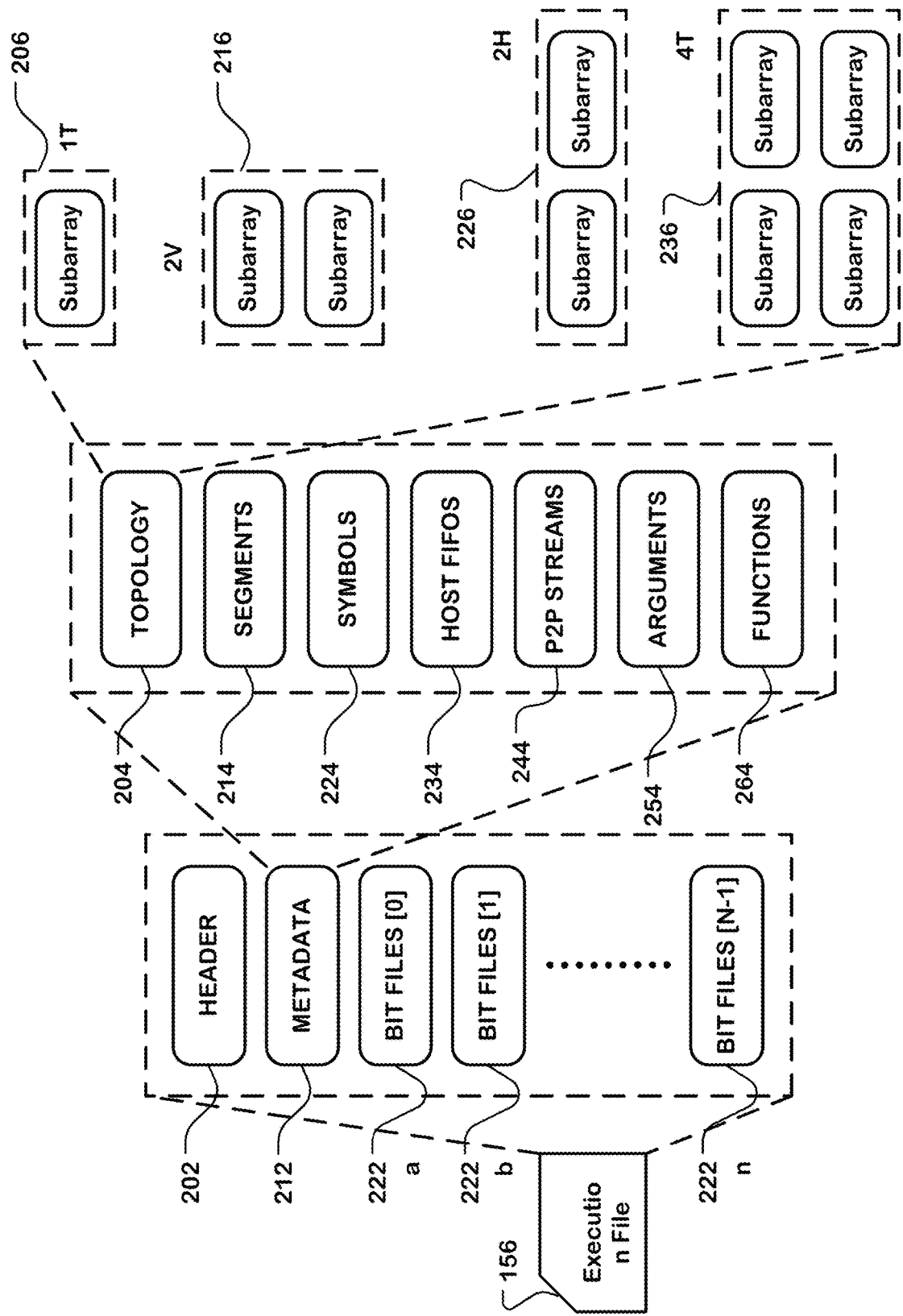
FIG. 2 depicts one implementation of an execution file used by the technology disclosed to execute the applications on different topologies of subarrays of configurable units in reconfigurable processors in the pool of reconfigurable data flow resources.

Turning to FIG. 2, the execution file 156 includes configuration files (e.g., bit files 222*a*, 222*b*, . . . 222*n*) that implement the computation graphs 136 of the applications 102 using the configurable units in the reconfigurable processors. A program executable contains a bit-stream representing the initial configuration, or starting state, of each of the configurable units that execute the program. This bitstream is referred to as a bit file, or herein as a configuration file. The execution file 156 includes header 202 that indicates destinations on the reconfigurable processors for configuration data in the configuration files. In some implementations, a plurality of configuration files is generated for a single application.

The execution file 156 includes metadata 212 that accompanies the configuration files and specifies configurations of virtual data flow resources required to execute the applications 102. In one example, the execution file 156 can specify that a particular application needs an entire reconfigurable processor for execution, and as a result the metadata 212 identifies virtual data flow resources equaling at least the entire reconfigurable processor for loading and executing the configuration files for the particular application. In another example, the execution file 156 can specify that a particular application needs one or more portions of a reconfigurable processor for execution, and as a result the metadata 212 identifies virtual data flow resources equaling at least the one or more portions of the reconfigurable processor for loading and executing the configuration files for the particular application. In yet another example, the execution file 156 can specify that a particular application needs two or more reconfigurable processors for execution, and as a result the metadata 212 identifies virtual data flow resources equaling at least the two or more reconfigurable processors for loading and executing the configuration files for the particular application. In yet another example, the execution file 156 can specify that a particular application needs an entire first reconfigurable processor and one or more portions of a second reconfigurable processor for execution, and as a result the metadata 212 identifies virtual data flow resources equaling at least the first reconfigurable processor and the one or more portions of the second reconfigurable processor for loading and executing the configuration files for the particular application.

In yet another example, the execution file 156 can specify that a particular application needs an entire node for execution, and as a result the metadata 212 identifies virtual data flow resources equaling at least the entire node for loading and executing the configuration files for the particular application. In yet another example, the execution file 156 can specify that a particular application needs two or more nodes for execution, and as a result the metadata 212 identifies virtual data flow resources equaling at least the two or more nodes for loading and executing the configuration files for the particular application. In yet another example, the execution file 156 can specify that a particular application needs an entire first node and one or more reconfigurable processors of a second node for execution, and as a result the metadata 212 identifies virtual data flow resources equaling at least the entire first node and the one or more reconfigurable processors of the second node for loading and executing the configuration files for the particular application.

One skilled in the art would appreciate that the execution file 156 can similarly specify reconfigurable processors or portions thereof spanning across racks, pods, superpods, and zones in a data center, and as a result the metadata 212 identifies virtual data flow resources spanning across the racks, pods, superpods, and zones in the data center for loading and executing the configuration files for the particular application.

As part of the metadata 212, the execution file 156 includes topology information 204 that specifies orientation or shapes of portions of a reconfigurable processor required to load and execute the configuration files for a particular application. A reconfigurable processor includes an array of configurable units (e.g., compute units and memory units) in a programmable interconnect fabric. The array of configurable units is partitionable into a plurality of subarrays of configurable units. A subarray is a set (or grid) of configurable units in the array of configurable units. A subarray covers a portion of the array of configurable units. A tile is a portion of the array of configurable units with a certain number of configurable units.

In one implementation, a reconfigurable processor comprises a plurality of tiles of configurable units, for example, four tiles that form an array of configurable units in the reconfigurable processor. The topology information 204 specifies an orientation of tiles in the plurality of tiles required to load and execute the configuration files for a particular application. For example, when the particular application is allocated two tiles of the reconfigurable processor, the topology information 204 specifies whether the two tiles are arranged in a vertical orientation (2V) 216 or a horizontal orientation (2H) 226. The topology information 204 can also allocate a single tile (1T) 206 of the reconfigurable processor to the particular application. The topology information 204 can also allocate all four tiles (4T) 236 of the reconfigurable processor to the particular application. In other implementations, other geometries may be specified, such as a group of three tiles.

The execution file 156 also specifies virtual flow resources like PCIe channels, DMA channels, and DDR channels required to load and execute the configuration files for a particular application. The execution file 156 also specifies virtual flow resources like main memory (e.g., off-chip/external DRAM), local secondary storage (e.g., local disks (e.g., HDD, SSD)), remote secondary storage (e.g., distributed file systems, web servers), latches, registers, and caches (e.g., SRAM) required to load and execute the configuration files for a particular application.

The execution file 156 also specifies virtual memory segments 214 for the request virtual flow resources, including virtual address spaces of the virtual memory segments and sizes of the virtual address spaces. The execution file 156 also specifies symbols 224 (e.g., tensors, streams) required to load and execute the configuration files for a particular application. The execution file 156 also specifies HOST FIFOs 234 accessed by the configuration files for a particular application during execution. The execution file 156 also specifies peer-to-peer (P2P) streams 244 (e.g., data flow exchanges and control token exchanges between sources and sinks) exchanged between configurable units on which the configuration files for a particular application are loaded and executed. The execution file 156 also specifies arguments 254 that modify execution logic of a particular application by supplying additional parameters or new parameter values to the configuration files for the particular application. The execution file 156 also specifies functions 264 (e.g., data access functions like transpose, alignment, padding) to be performed by the configurable units on which the configuration files for a particular application are loaded and executed.

The runtime processor 166 receives the execution file 156 from the SDK 142 and uses the execution file 156 for resource allocation, memory mapping, and execution of the configuration files for the applications 102 on the pool of reconfigurable processors 178. The runtime processor 166 communicates with the SDK 142 over APIs (e.g., Python APIs 154). The runtime processor 166 can directly communicate with the deep learning frameworks 114 over APIs (e.g., C/C++ APIs 152).

The runtime processor 166 parses the execution file 156 and determines configurations of the virtual data flow resources required to execute the applications 102. The runtime processor 166 allocates physical configurable units and memory in the pool of reconfigurable data flow resources 178 to the virtual data flow resources. The runtime processor 166 then loads the configuration files for the applications 102 to the allocated physical configurable units. The runtime processor 166 then executes the applications 102 using the allocated physical configurable units and memory. The runtime processor 166 also includes logic to return the allocated physical configurable units and memory for an executed user application to the pool of reconfigurable data flow resources 178 for reallocation to another user application. The runtime processor 166 exchanges data with the pool of reconfigurable data flow resources 178, for example, over a PCIe interface 172.

An application for the purposes of this description includes the configuration files for reconfigurable data flow resources in the pool of reconfigurable data flow resources 178 compiled to execute a mission function procedure or set of procedures using the reconfigurable data flow resources, such as inferencing or learning in an artificial intelligence or machine learning system. A virtual machine for the purposes of this description comprises a set of reconfigurable data flow resources (including configurable units in one or more reconfigurable processor and bus and memory channels) configured to support execution of an application in an array or subarray of configurable units and associated bus and memory channels in a manner that appears to the application as if there were a physical constraint on the resources available, such as would be experienced in a physical machine. The virtual machine can be established as a part of the application of the mission function that uses the virtual machine, or it can be established using a separate configuration mechanism. In implementations described herein, virtual machines are implemented using resources of the pool of reconfigurable data flow resources 178 that are also used in the application, and so the configuration files for the application include the configuration data for its corresponding virtual machine, and links the application to a particular set of configurable units in the array or subarray of configurable units and associated bus and memory channels.

The runtime processor 166 implements a first application in virtual machine VM1 that is allocated a particular set of reconfigurable data flow resources and implements a second application in virtual machine VM2 that is allocated another set of reconfigurable data flow resources. Virtual machine VM1 includes a particular set of configurable units, which can include some or all configurable units of a single reconfigurable processor or of multiple reconfigurable processors, along with associated bus and memory resources (e.g., PCIe channels, DMA channels, DDR channels, DRAM memory). Virtual machine VM2 includes another set of configurable units, which can include some or all configurable units of a single reconfigurable processor or of multiple reconfigurable processors, along with associated bus and memory resources (e.g., PCIe channels, DMA channels, DDR channels, DRAM memory).

The runtime processor 166 respects the topology information 204 in the execution file 156 when allocating physical configurable units to the virtual data flow resources requested in the execution file 156. For example, due to the non-uniform communication bandwidth in East/West directions versus North/South directions in the reconfigurable processors, a virtual tile geometry that requires, for example, two tiles arranged horizontally, may suffer in performance if mapped to a physical tile geometry in which two tiles are arranged vertically. In some implementations, the topology information 204 specifies rectilinear tile geometries.

As discussed above, the configurations of virtual data flow resources in the execution file 156 specify virtual memory segments for the reconfigurable data flow resources in the pool of reconfigurable data flow resources 178, including virtual address spaces of the virtual memory segments and sizes of the virtual address spaces. The runtime processor 166 maps the virtual address spaces of the virtual memory segments to physical address spaces of physical memory segments in the memory. The memory can be host memory, or device memory (e.g., off-chip DRAM). The runtime processor 166 configures control and status registers of the reconfigurable data flow resources in the pool of reconfigurable data flow resources 178 with configuration data identifying the mapping between the virtual address spaces and the physical address spaces for the configuration files to access the physical memory segments during execution of the applications 102. Accordingly, a first set of the physical memory segments mapped to a first set of the reconfigurable data flow resources in the pool of reconfigurable data flow resources 178 allocated to a first application are different from a second set of the physical memory segments mapped to a second set of the reconfigurable data flow resources in the pool of reconfigurable data flow resources 178 allocated to a second application. Furthermore, access of the first set of the reconfigurable data flow resources is confined to the first set of the physical memory segments, and access of the second set of the reconfigurable data flow resources is confined to the second set of the physical memory segments.

Figure 3:
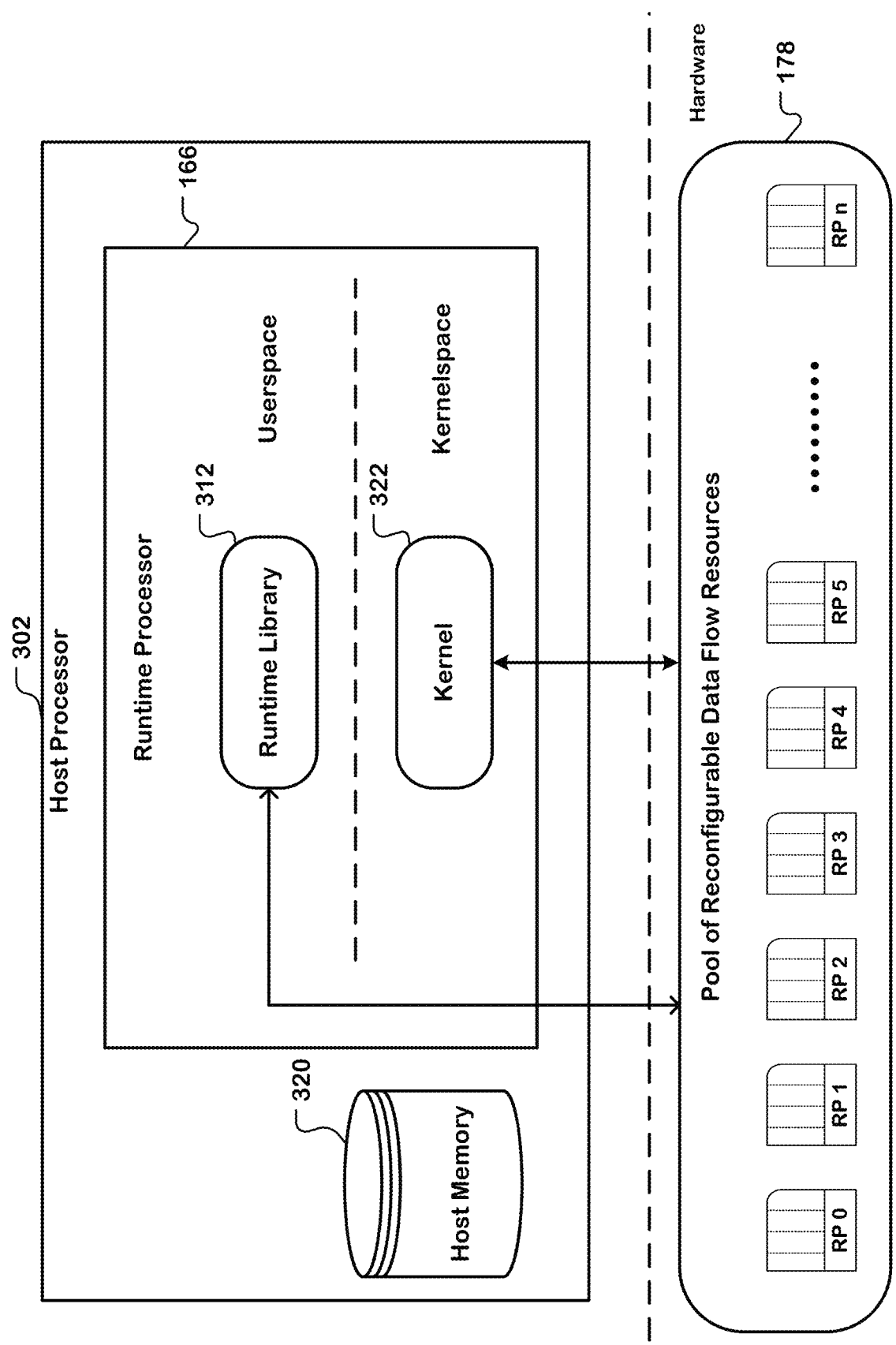
FIG. 3 portrays a runtime processor of the technology disclosed, which creates virtual machines using the reconfigurable data flow resources in the pool of reconfigurable data flow resources and executes the applications in the virtual machines.

Turning to FIG. 3, the runtime processor 166 runs in a host processor 302, which is operatively coupled to the pool of reconfigurable data flow resources 178 (e.g., via a PCIe interface). The host processor 302 runs the software components for user request, compute resource, and communication management. In one implementation, the host processor 302 uses a PCIe interface that manages reconfiguration of the reconfigurable processors and movement of data into and out of the reconfigurable processors. A built-in arbiter guarantees fair communication bandwidth to every reconfigurable processor when multiple reconfigurable processors are communicating with the runtime processor 166.

The runtime processor 166 includes a runtime library 312 that runs in a userspace of the host processor 320. The runtime processor 166 includes a kernel module 322 that runs in a kernelspace of the host processor 302. The host processor 302 has host memory 320. In implementations disclosed herein, the runtime processor 166, based on virtual data flow resources requested in the execution file 156 for configuration files of a particular application, allocates segments of the host memory 320 to a virtual machine that implements the particular application. In one implementation, the runtime processor 166 runs on top of Linux.

The runtime processor 166 partitions the physical hardware resources, i.e. the reconfigurable processors, into multiple virtual resources, and provides uniform and coherent access to these virtual resources as being physical in a balanced and unified view. It also manages all interactions among the applications 102 and their required resources by handling the traffic of application requests for reconfigurable resources, memory, and I/O channels.

Figure 4:
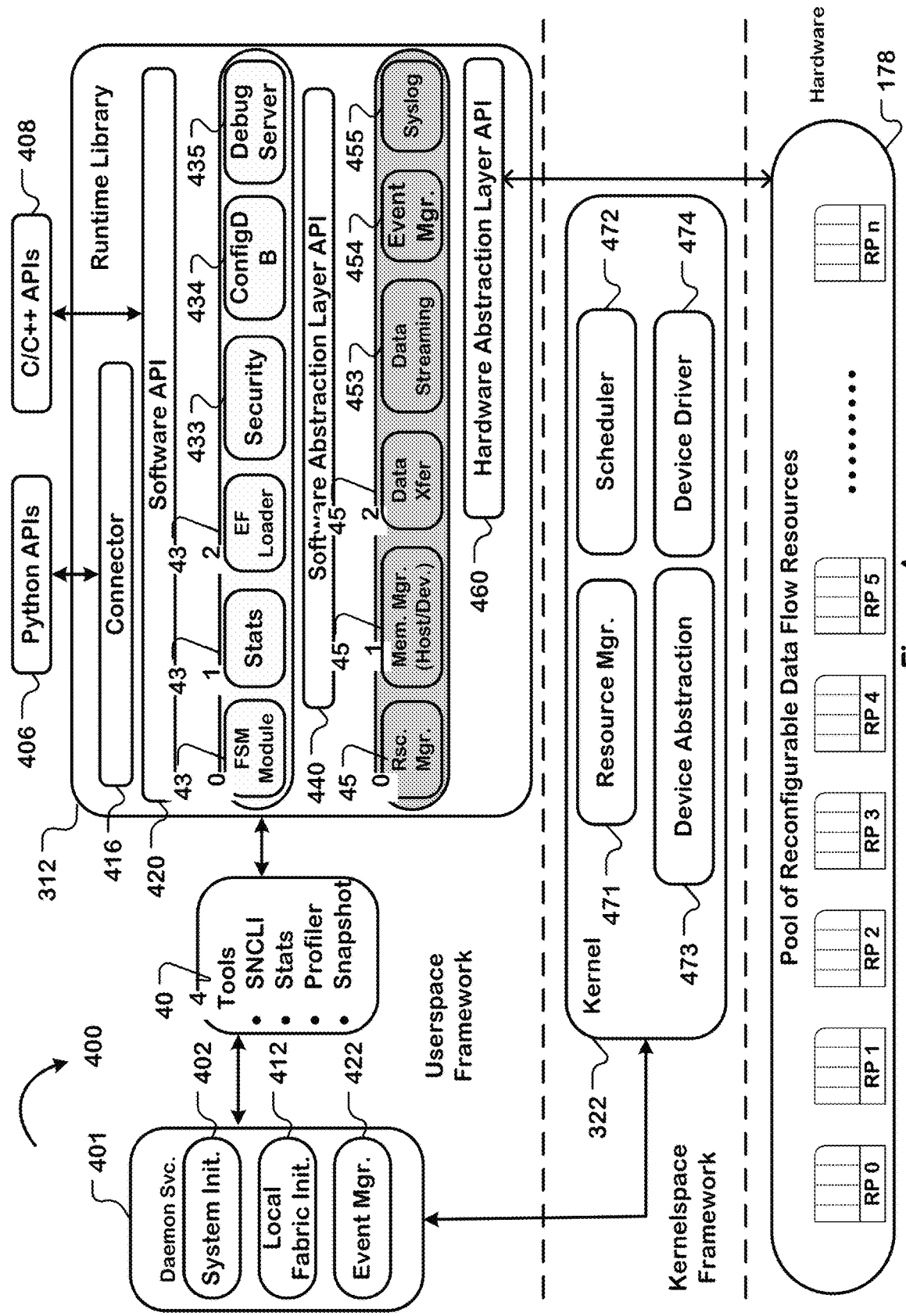
FIG. 4 illustrates one implementation of a software stack implemented by the runtime processor of FIG. 3, which enables runtime virtualization of reconfigurable data flow resources in the pool of reconfigurable data flow resources according to the technology disclosed.

FIG. 4 illustrates one implementation of a software stack 400 implemented by the runtime processor 166, which enables runtime virtualization of reconfigurable data flow resources in the pool of reconfigurable data flow resources 178 according to the technology disclosed. The software stack 400 is part of the runtime processor 166 and includes a daemon service 401, tools 404, and the runtime library 312, which operate in the userspace framework. The software stack 400 also includes the kernel 322, which operates in the kernelspace framework.

The daemon service 401 runs as a system service and includes a system initializer 402, a local fabric initializer 412, and an event manager 422. The system initializer 402 initializes the reconfigurable processors in the pool of reconfigurable data flow resources 178. The local fabric initializer 412 initializes bus and memory resources, including device DDR and local PCIe fabric. The event manager 422 manages hardware faults and enables debugging of the hardware resources in the pool of reconfigurable data flow resources 178. The tools 404 include a command line interface (CLI), a statistics provider, a profiler and snapshot for debugging, profile system, and graph applications.

The runtime library 312 includes a connector 416, a software API 420, a software abstraction layer API 440, and a hardware abstraction layer API 460. The connector 416, the software API 420, the software abstraction layer API 440, and the hardware abstraction layer API 460 are a collection of multilingual programming API suites (e.g., Python/C/C++) that the applications 102 (e.g., machine learning applications) can use to interact with the reconfigurable processors and their associated memory subsystems. The applications 102 access the software stack 400 via the APIs like Python APIs 406 and C/C++ APIs 408.

The runtime library 312 also includes a finite state machine (FSM) module 430, a statistics calculator 431, an execution file loader 432, a security module 433, a configuration database 434, and a debug server 435. The FSM module 430 defines a list of states representing the basic operations that can be grouped together to form an operation flow for an application. The statistics calculator 431 provides interfaces to read performance counters from the reconfigurable processors in the pool of reconfigurable data flow resources 178. The execution file loader 432 loads and parses the execution file 156 and creates data structures of resources needed to run an application (e.g., number of tiles/reconfigurable processors, memory segments, arguments, host FIFOs, etc.). The security module 433 maintains isolation between applications and prevents users/applications from accessing resources not allocated to them. The configuration database 434 includes configuration data required to configure the reconfigurable data flow resources in the pool of reconfigurable data flow resources 178 for executing the applications 102. The debug server 435 processes the CLI commands.

The runtime library 312 also includes a resource manager 450, a memory manager 451, a data transfer module 452, a data streaming module 453, an event manager 454, and a system log 455. The resource manager 450 generates requests for the kernel 322 to manage resources in the pool of reconfigurable data flow resources 178. The memory manager 451 manages the host memory and the device memory (e.g., on-chip and off-chip memory of the reconfigurable processors) and provides efficient allocation/free functions for the applications 102 and binary data (e.g., bit files, data, arguments, segments, symbols, etc.) in the execution file 156. The data transfer module 452 handles data transfer requests between the host processor 302 and the reconfigurable processors. The data transfer module 452 provides APIs to transfer bit files, arguments, tensors, etc. from the host memory to the reconfigurable processor memory and from the reconfigurable processor memory to the host memory. The transfer is done through hardware supported methods like DMA, mapped memory, and RDMA. The data streaming module 453 provides GET/SET interfaces to stream data in and out of the reconfigurable processors using host FIFOs. The event manager 454 identifies the source of hardware interrupts and delivers interrupt events to the daemon service 401 and/or the applications 102. The system log 455 logs messages from the daemon service 401 and the applications 102.

The kernel 322 includes a resource manager 471, a scheduler 472, a device abstraction module 473, and a device driver 474. The resource manager 471 manages the host memory and the device memory (e.g., on-chip and off-chip memory of the reconfigurable processors) and provides efficient allocation/free functions for the applications 102 and binary data (e.g., bit files, data, arguments, segments, symbols, etc.) in the execution file 156. The scheduler 472 manages queuing and mapping of the configuration files for the applications 102 depending on the availability of the hardware resources. The device abstraction module 473 scans all the reconfigurable processors in the pool of reconfigurable data flow resources 178 and presents them as a single virtual reconfigurable processor device to the userspace. The device driver 474 creates device nodes, interfaces with the reconfigurable processors (e.g., by managing low level PCIe input/output operations and DMA buffers), and processes hardware interrupts.

Figure 5:
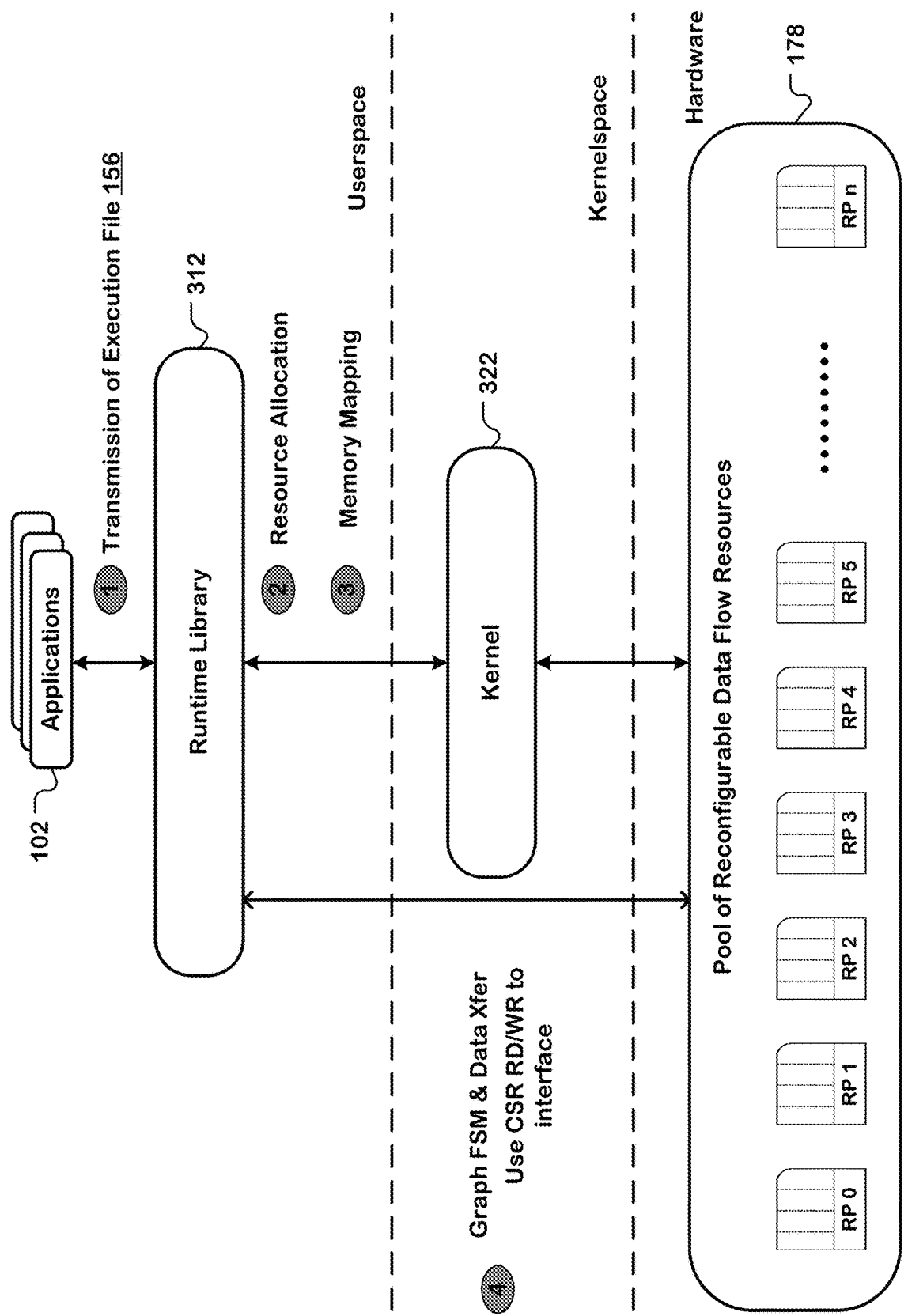
FIG. 5 shows one implementation of a single-user execution flow used by the runtime processor of FIG. 3 to create the virtual machines and execute the applications in the virtual machines for a single user.
Figure 6:
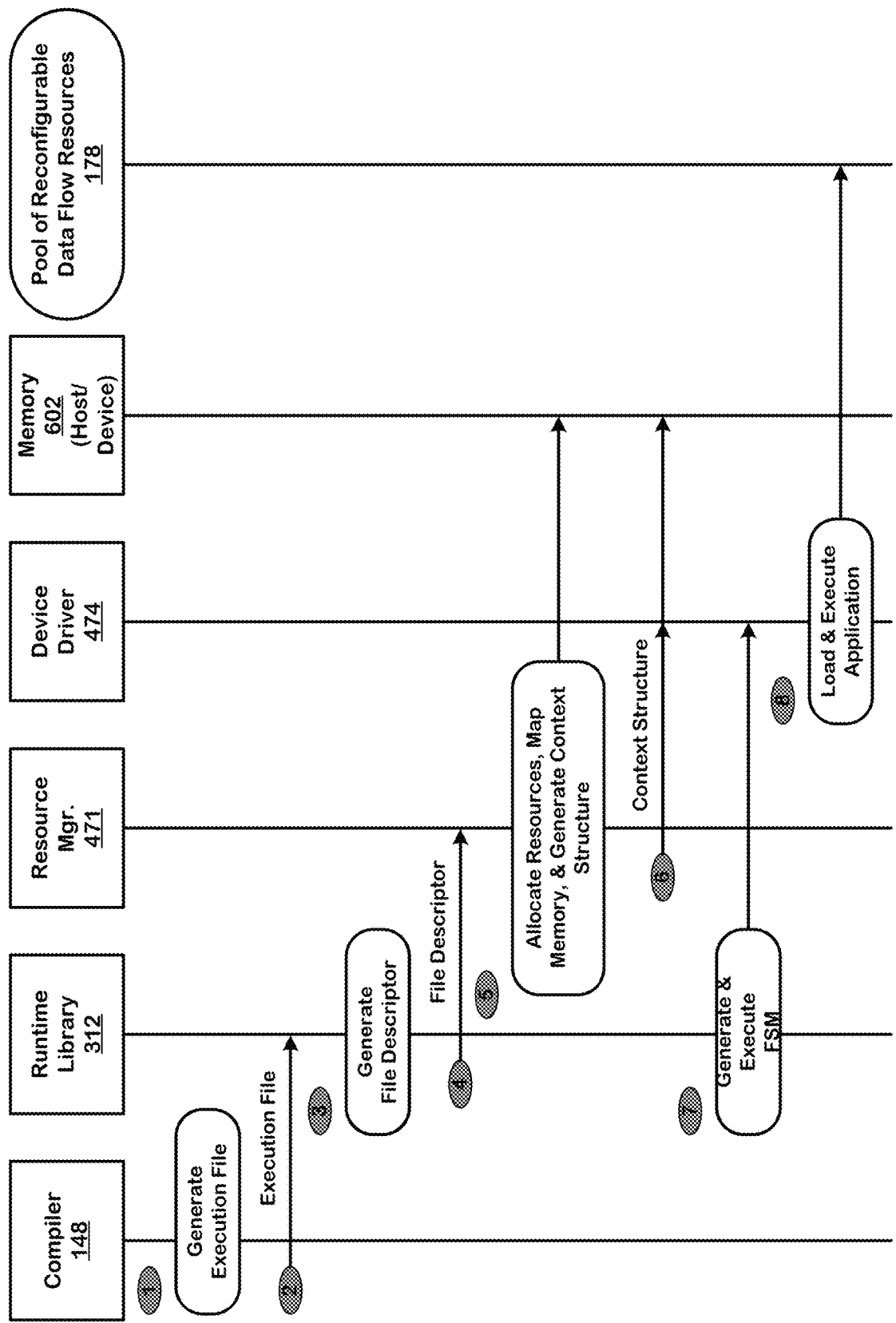
FIG. 6 depicts one implementation of data exchange between various components of the runtime processor to create the virtual machines and execute the applications in the virtual machines.

FIG. 5 shows one implementation of a single-user execution flow used by the runtime processor 166 to create the virtual machines and execute the applications 102 in the virtual machines for a single user. FIG. 6 depicts one implementation of data exchange between various components of the runtime processor 166 to create the virtual machines and execute the applications in the virtual machines. The following discussion combines description of FIGS. 5 and 6 because these figures contain similar actions.

The runtime processor 166 abstracts out multiple PCIe reconfigurable processor devices, including their hardware resources (e.g., arrays and subarrays of configurable units, DMA channels, and device memory), into a single virtual reconfigurable processor device for the applications 102 running in the user space.

The kernel module 322 dynamically discovers PCIe reconfigurable processor devices in the pool of reconfigurable data flow resources 178 during module initialization and presents them as a single virtual device/dev/rdu to the applications 102 running in the user space. As a result, each reconfigurable processor device acts as a core and each subarray of configurable units (e.g., tile) acts a hardware thread, which can be dynamically allocated to a process by the resource manager 471 of the kernel module 322.

The runtime library 312 opens/dev/rdu with an open system call. At action 1 in FIG. 6, the compiler generates the execution file 156. At action 1 in FIG. 5 and action 2 in FIG. 6, the runtime library 312 receives the execution file 156 from the compiler 148. The runtime library 312 parses the execution file 156 and determines the configuration of virtual data flow resources required to execute the configuration files for the applications 102.

At action 3 in FIG. 6, the runtime library 312 generates a data structure (e.g., a file descriptor generated by an open system call) that identifies the virtual data flow resources as the computational needs of a computation graph to be loaded. At action 4 in FIG. 6, the runtime library 312 uses the file descriptor returned by the open system call to issue an IOCTL system call to the kernel 322 with the computational needs of the particular computation graph to be loaded.

At action 2 in FIG. 5 and action 5 in FIG. 6, the resource manager 471 fields this request by isolating and allocating the needed physical resources from the pool of available resources 178. The resource manager 471 generates a context structure that identifies the physical resources allocated to a particular process (computation graph). The resource manager 471 places the context structure in a corresponding file pointer's private data.

At action 3 in FIG. 5 and action 6 in FIG. 6, the device driver 474 uses the context structure to create a contiguous memory map comprising various partitioned regions in response to resource allocation requests. Since only allocated hardware resources are memory mapped, the resource manager 471 provides isolation amongst applications and applications do not have access outside of the mapped region thus securing hardware resources in a multi-user environment.

The allocated physical resources to a computation graph, including tiles, DMA channels, and device memory, can be managed either in user space or in kernel space. In user mode, the user process calls mmap system call, and a virtualized view of the allocated reconfigurable data flow resources becomes accessible in the process' virtual memory. This eliminates user-kernel context switching during graph execution. In the kernel mode, the reconfigurable data flow resource accesses stay in kernel space and user processes interface with their respective compute resources via coarse grained IOCTL calls or lockless command/result ring buffers.

At action 4 in FIG. 5 and at actions 7 and 8 in FIG. 6, a finite state machine is generated by the runtime library 312, which is used to load and run the configuration files for the applications 102 onto the reconfigurable processors. This also includes transferring configuration data to the reconfigurable processors using control and status registers. The control and status registers are present in almost all the hardware units (e.g., PCIe channel controllers, DDR channel controllers, tile components like a AGCUs, PMUs, etc.), and are accessed by the runtime library 312 to read error status, configure hardware capabilities, and initiate hardware operations (like loading a bit file).

Figure 7:
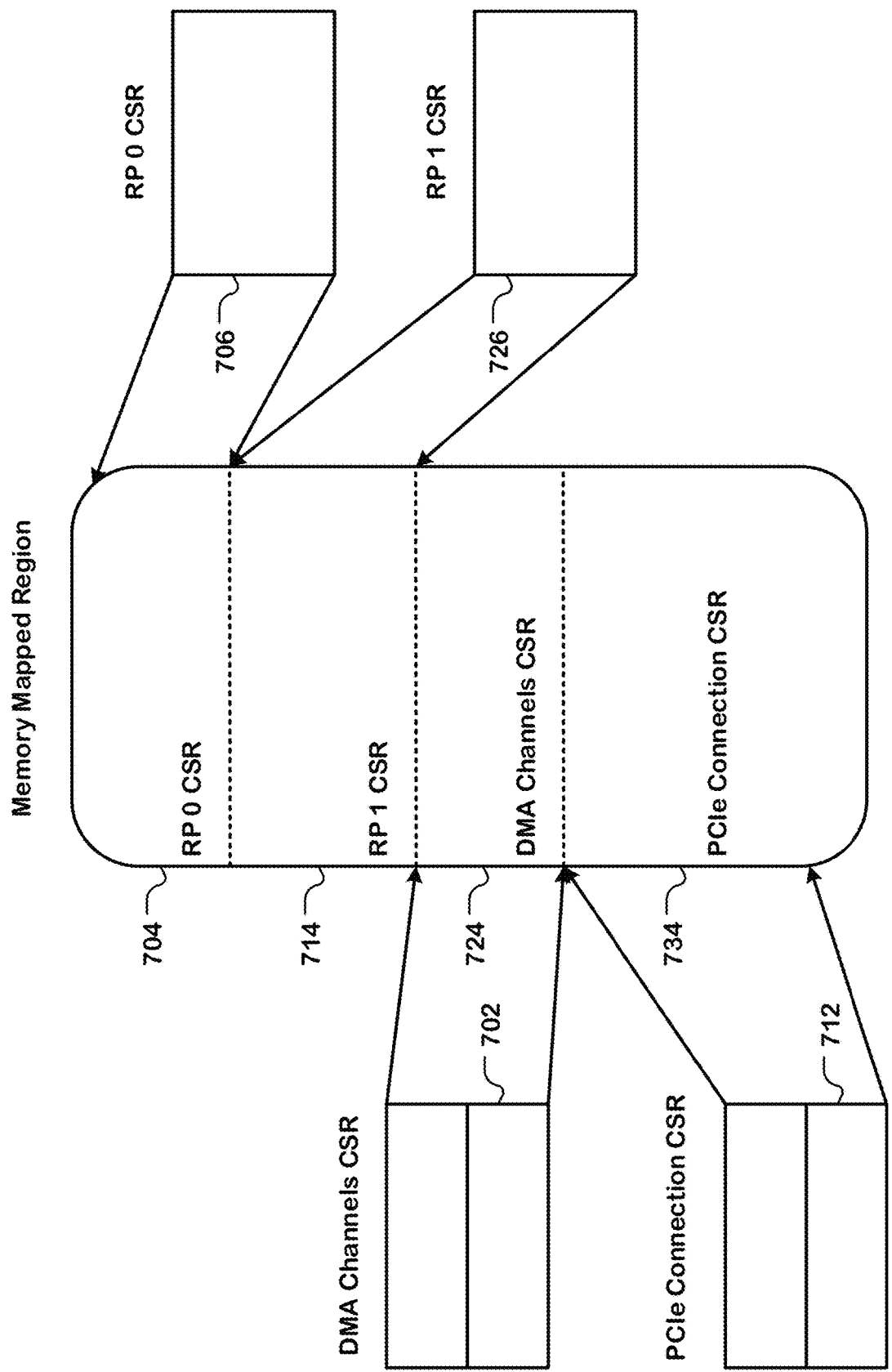
FIG. 7 portrays one implementation of mapping reconfigurable data flow resources allocated to a virtual machine to physical memory.

FIG. 7 portrays one implementation of mapping reconfigurable data flow resources allocated to a virtual machine to physical memory. FIG. 7 shows that control and status registers of reconfigurable data flow resources allocated to a particular application are used for memory mapping the reconfigurable data flow resources from a virtual memory space (e.g., DMA channels CSR 702, PCIe connection CSR 712, reconfigurable processor (RP) 0 control and status register (CSR) 706, and RP 1 CSR 726) to a contiguous physical memory space (e.g., DMA channels CSR 724, PCIe connection CSR 734, RP 0 CSR 704, and RP 1 CSR 714).

During the resource allocation step, the runtime library 312 examines the memory segments required by each computation graph and assigns virtual and physical addresses to them, working with the kernel 322 (e.g., malloc, mmap). Depending on the specification of the segment type, physical memory can be allocated in host memory or the accelerator/device memory. This leads to a segment lookaside buffer (SLB) in the reconfigurable processors being programmed with the virtual, physical address mapping so that the computation graph running on the accelerator can access the appropriate segment wherever it resides. The control and status registers are mmapped into the program's address space.

Once the computation graph is executed, the runtime library 312 calls a close system call, and the associated resources are freed back into the available pool of resources 178.

Figure 8:
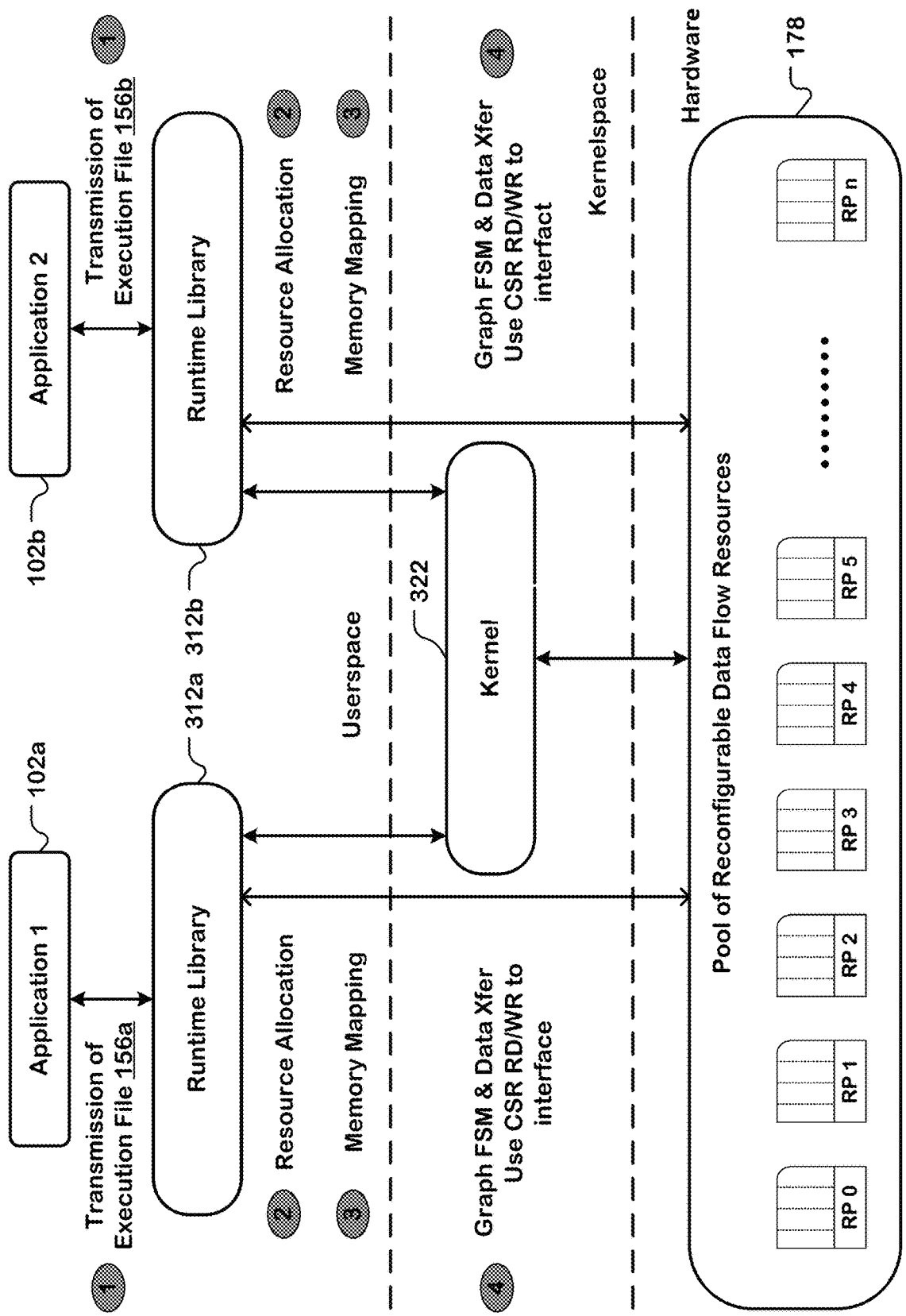
FIG. 8 depicts one implementation of a multi-user execution flow used by the runtime processor of FIG. 4 to create processes or dockers/containers and execute the applications in the processes or dockers/containers for multiple users.

FIG. 8 depicts one implementation of a multi-user execution flow used by the runtime processor of FIG. 4 to create processes or dockers/containers and execute the applications in the processes or dockers/containers for multiple users. In FIG. 8, applications 102*a* (user 1) and 102*b* (user 2) are executed concurrently using instances 312*a* and 312*b* of the runtime library 312. The execution flow for an individual user is described with respect to FIGS. 5, 6, and 7, and is implemented in parallel for multiple users.

Figure 9:
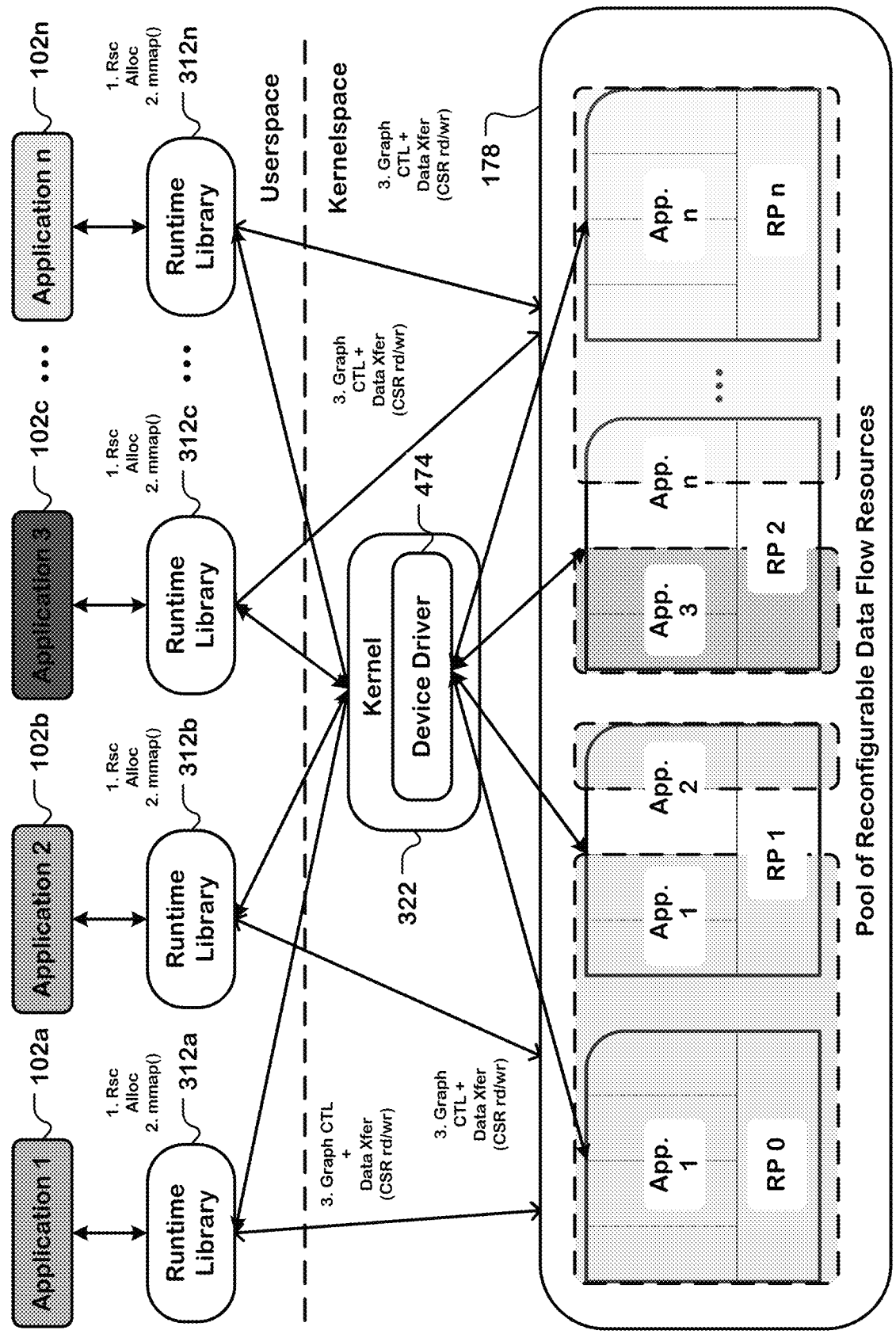
FIG. 9 illustrates one implementation of concurrently executing the applications on different topologies of the subarrays of configurable units in the reconfigurable processors in the pool of reconfigurable data flow resources.

FIG. 9 illustrates one implementation of concurrently executing the applications 102 on different topologies of the subarrays of configurable units in the reconfigurable processors in the pool of reconfigurable data flow resources 178. The example illustrated in FIG. 9 shows a plurality of applications 102*a*, 102*b*, 102*c*, . . . , 102*n*, which are concurrently executed by different instances 312*a*, 312*b*, 312*c*, . . . , 312*n* of the runtime library 312 using the pool of reconfigurable data flow resources 178.

Based on the topologies specified in the execution file 156, the runtime library 312 allocates one or more subarrays of configurable units of a single reconfigurable processor to two or more configuration files of two or more application graphs based on the topologies. The device driver 474 concurrently loads and executes the two or more configuration files on the subarrays of the single reconfigurable processor. This is illustrated in FIG. 9 by the configuration files for applications 1 and 2 running on reconfigurable processor 1 (RP 1) and the configuration files for applications 3 and n running on reconfigurable processor 2 (RP 2).

Based on the topologies specified in the execution file 156, the runtime library 312 allocates subarrays of two or more reconfigurable processors to a single configuration file of a single application graph based on the topologies. The device driver 474 concurrently loads and executes the single configuration file on the subarrays of the two or more reconfigurable processors. This is illustrated in FIG. 9 by the configuration files for application 1 running on reconfigurable processor 0 (RP 0) and reconfigurable processor 1 (RP 1), and the configuration files for application n running on reconfigurable processor 2 (RP 2) and reconfigurable processor n (RP n).

The reconfigurable processors 0, 1, 2, and n form a plurality of integrated circuits. The reconfigurable processors 0, 1, 2, and n can be implemented on a single integrated circuit die or on a multichip module. An integrated circuit can be packaged in a single chip module or a multi-chip module (MCM). An MCM is an electronic package consisting of multiple integrated circuit die assembled into a single package, configured as a single device. The various die of an MCM are mounted on a substrate, and the bare die of the substrate are connected to the surface or to each other using for some examples, wire bonding, tape bonding or flip-chip bonding.

The runtime processor 166 (i.e., the runtime library 312) is configured to receive a configuration file for a user application. The configuration file specifies virtual resources required to execute the user application. The virtual resources span two or more of the integrated circuits. A single or common device driver 474 is operatively coupled to the plurality of integrated circuits (i.e., reconfigurable processors 0, 1, 2, and n). The device driver 474 includes logic to allocate, to the virtual resources in the configuration file, physical configurable units and memory across the two or more of the integrated circuits, and load the configuration file to the allocated physical configurable units, and execute the user application using the allocated physical configurable units and memory.

Figure 11:
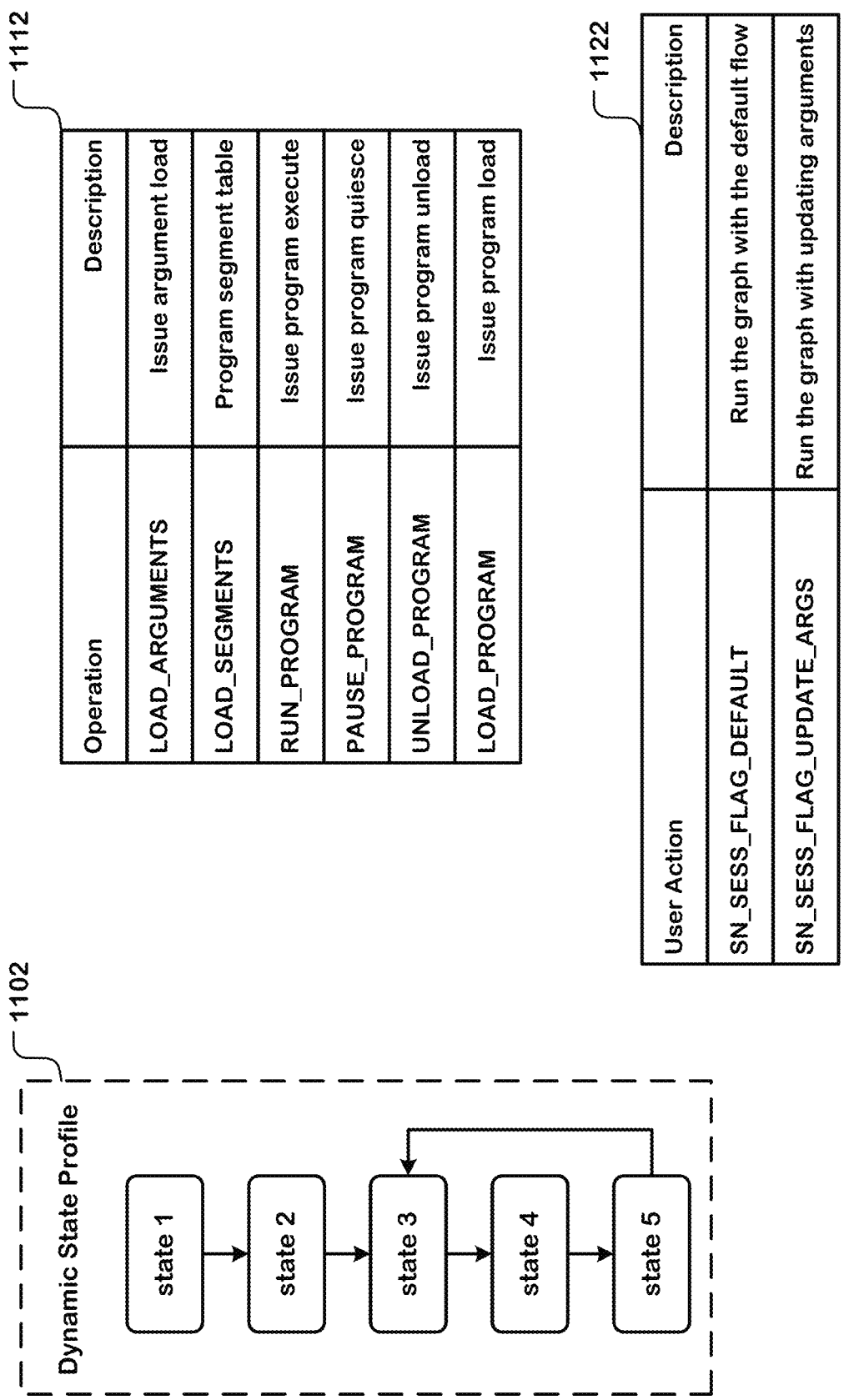
FIG. 11 illustrates one implementation of a dynamic state profile created and used by the runtime processor to execute the applications in the virtual machines using a sequence of graph control operations represented as states.

FIG. 11 illustrates a dynamic state profile 1102 generated by the finite state machine (FSM) module 430 based on the configurations of virtual data flow resources identified in the execution file 156 and user specified actions. Example operations 1112 and user actions 1122 are depicted in FIG. 11.

Figure 12:
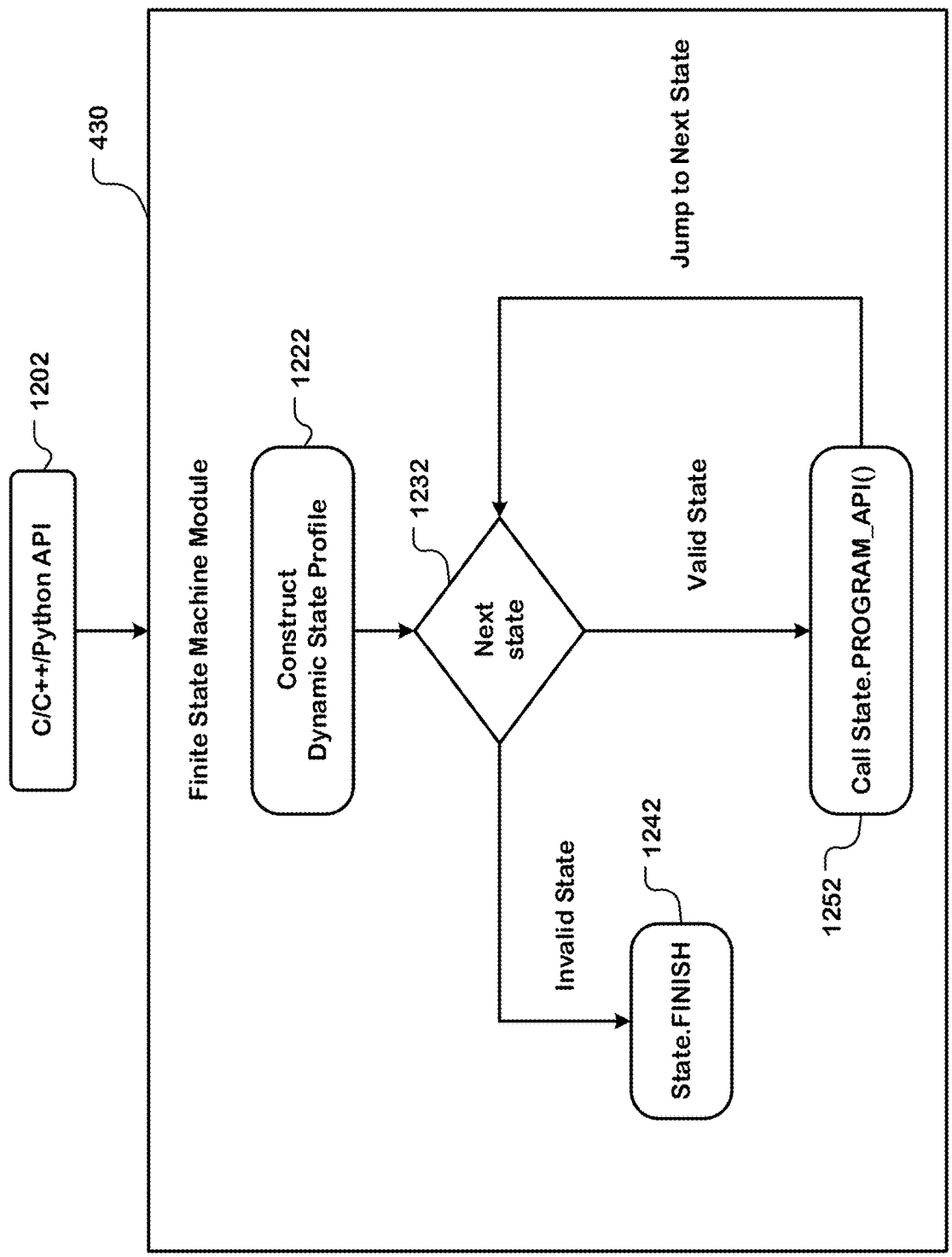
FIG. 12 shows a configuration load process that includes generating the dynamic state profile of FIG. 11 based on the configurations of virtual data flow resources specified in the execution file.

FIG. 12 shows a configuration load process that includes generating a dynamic state profile based on the configurations of virtual data flow resources and progressively traversing states of the dynamic state profile. The states including at least one of loading the configuration files, loading arguments modifying the configuration files, loading virtual memory segments supporting the configuration files, beginning execution of the configuration files, pausing execution of the configuration files, and unloading the configurations files after execution.

At action 1222, the FSM module 430 generates the dynamic state profile 1102 by parsing the execution file 156 and determining the operations required to load and execute the configuration files for a particular application. An application can have a plurality of configuration files (e.g., 1000 configuration files per application), and the FSM module 430 generates the dynamic state profile 1102 for each configuration file in the plurality of configuration files.

Figure 13:
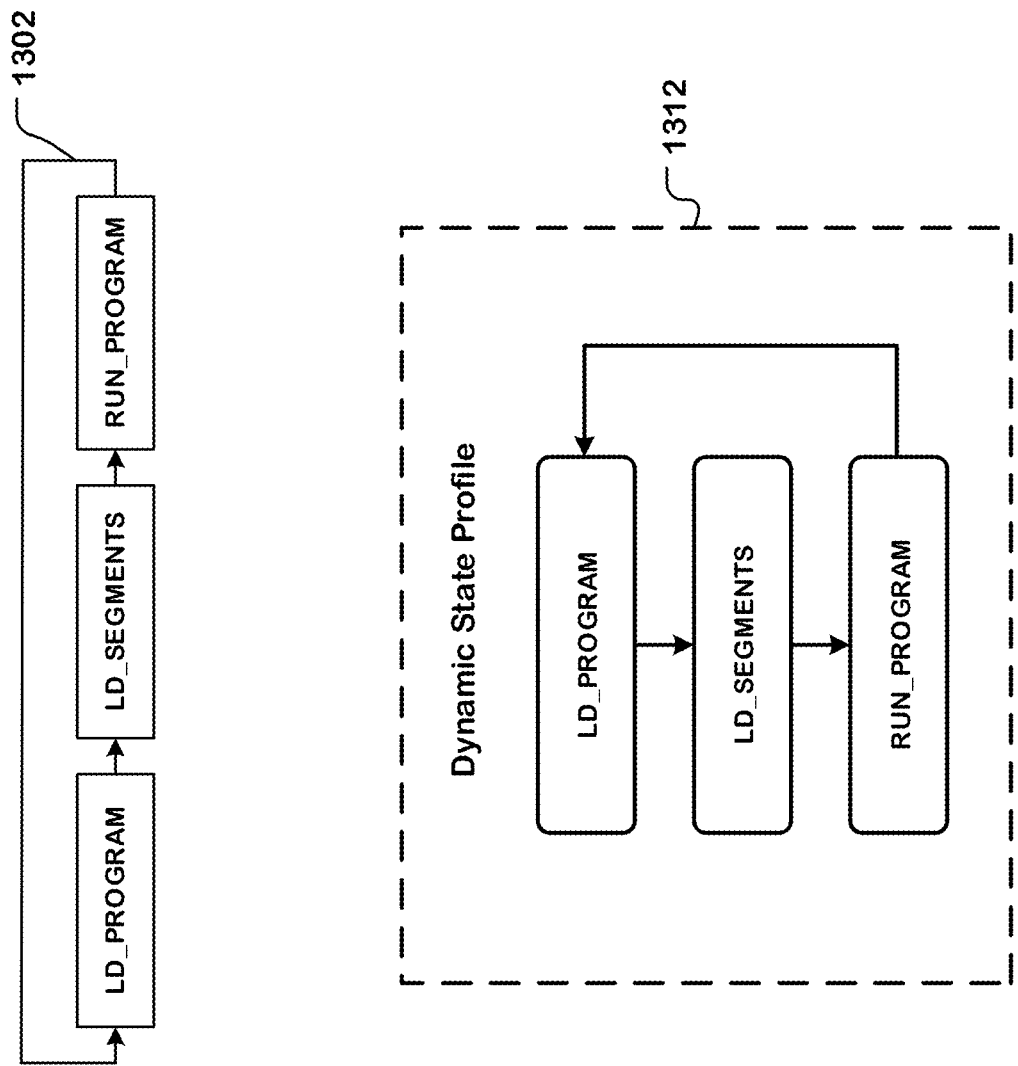
FIGS. 13, 14, and 15 show various examples of the dynamic state profile based on the operations needed to load and execute a corresponding configuration file.

The number and type of states in the dynamic state profile 1102 are dependent on the operations required to load and execute a particular configuration file, as specified by the execution file 156. Turning to FIG. 13, consider, for example, that the following three operations are required to execute a configuration file 1302 for a particular application: LD_PROGRAM, LD_SEGMENTS, and RUN_PROGRAM. Then, the corresponding dynamic state profile 1312 generated by the FSM module 430 includes only the three states that respectively represent these three operations determined from the execution file 156.

Figure 14:
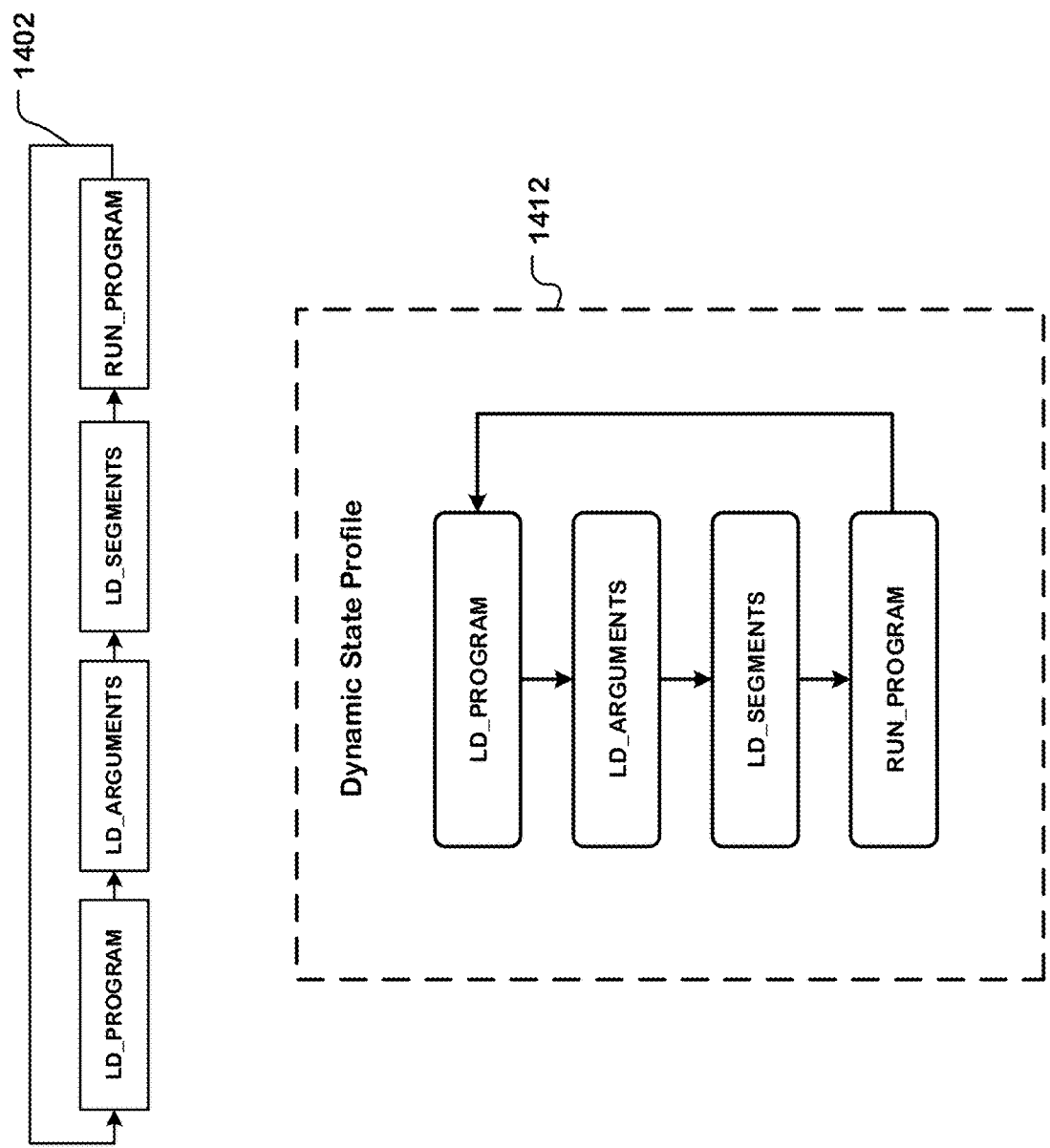

Turning to FIG. 14, consider, for example, that the following four operations are required to execute a configuration file 1402 for a particular application: LD_PROGRAM, LD_ARGUMENTS, LD_SEGMENTS, and RUN_PROGRAM. Then, the corresponding dynamic state profile 1412 generated by the FSM module 430 includes only these four states that respectively represent the four operations determined from the execution file 156.

Figure 15:
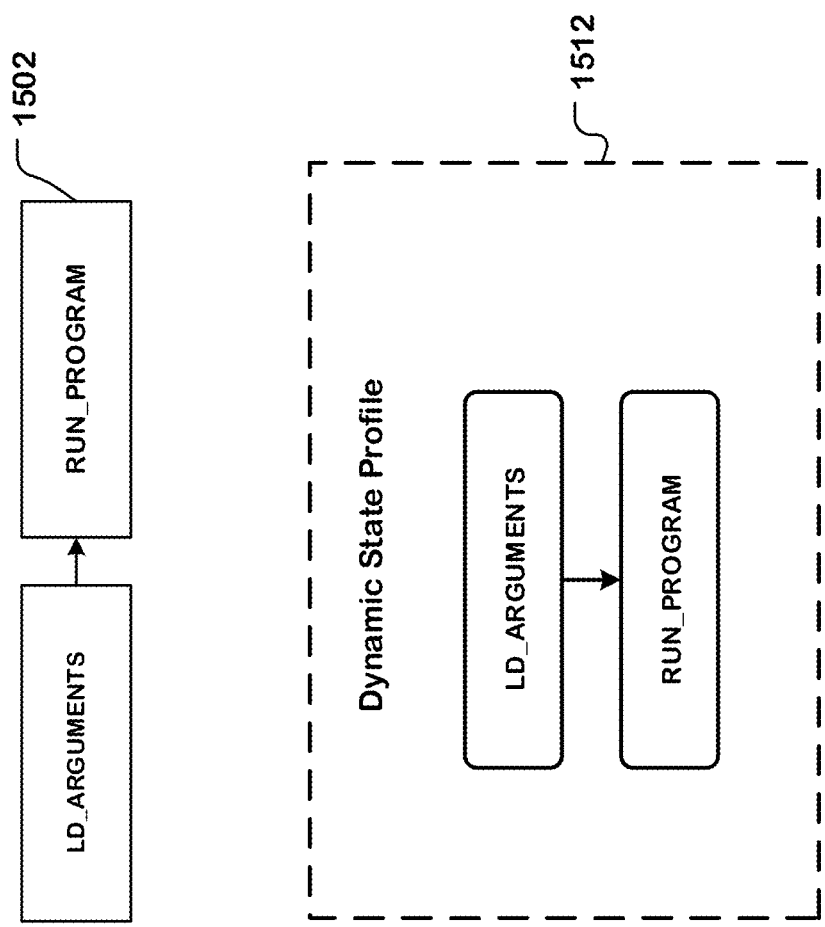

Turning to FIG. 15, consider, for example, that the following two operations are required to execute a configuration file 1502 for a particular application: LD_ARGUMENTS and RUN_PROGRAM. Then, the corresponding dynamic state profile 1512 generated by the FSM module 430 includes only these two states that respectively represent the two operations determined from the execution file 156.

Accordingly, the dynamic state profile 1102 does not contain redundant states that are not needed to load or execute a particular configuration file, and only contains states that are prescribed in the execution file 156 or supplied by the users. With hundreds and thousands of configuration files loaded and execute for a single application, this leads to efficient loading and unloading of configuration files because compute time and resources are not wasted on traversing unnecessary states/operations.

The FSM module 430 then loads and executes the configuration file by traversing through a next state 1232 of the dynamic state profile 1102. For each valid state, as action 122, the FSM module 1222 invokes a corresponding API that causes the operation corresponding to the valid state to be executed (e.g., a load API loads the configuration file and a run API loads the configuration file). The FSM module 430 terminates the dynamic state profile 1102 when it arrives at an invalid state 1242.

Figure 16:
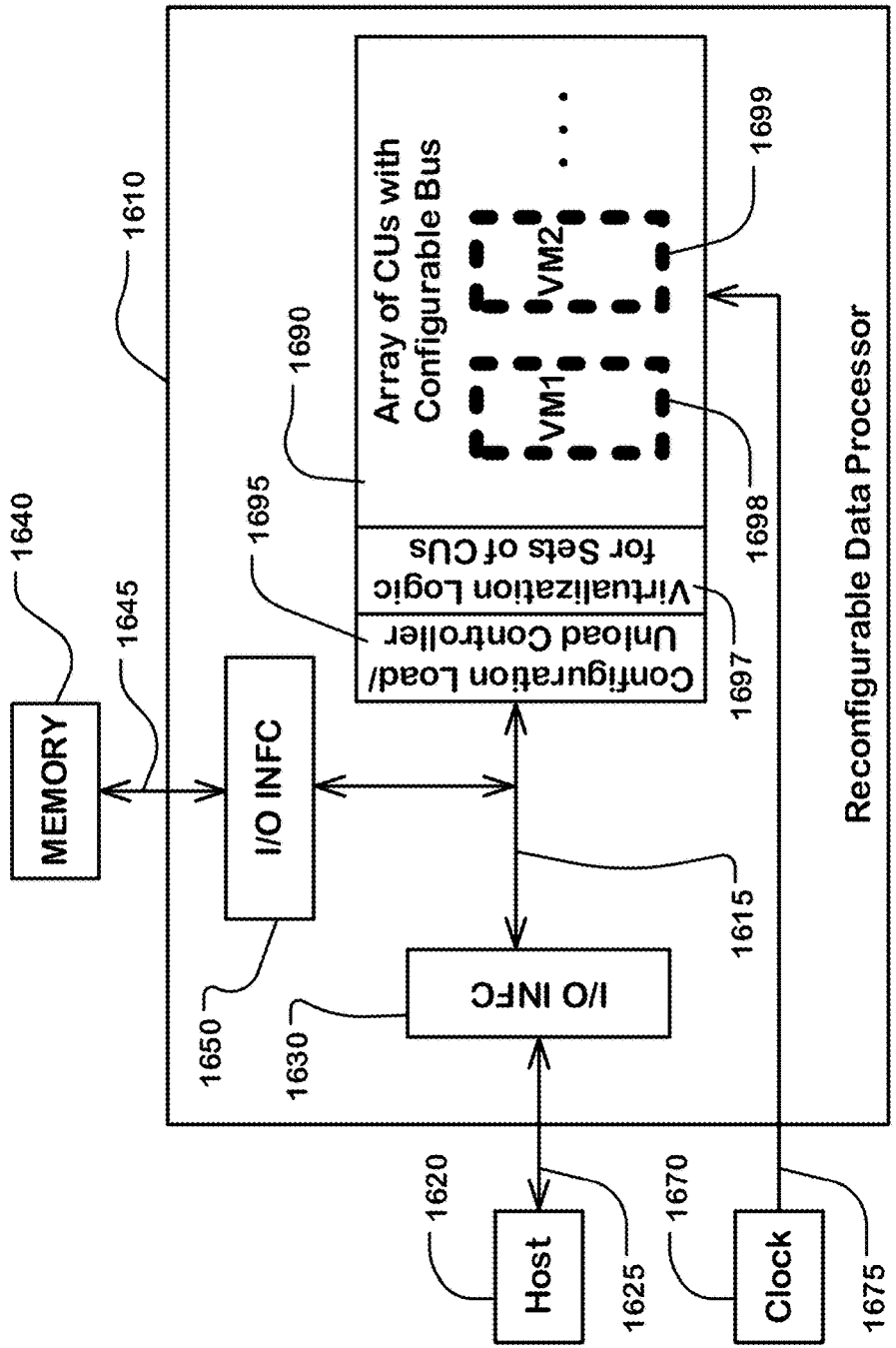
FIG. 16 is a system diagram illustrating a system including a host, a memory, and a reconfigurable data processor.

FIG. 16 is a diagram illustrating a system 1600 including a host 1620, a memory 1640, and a reconfigurable data processor 1610 in which a computation unit as described herein is deployed by hardware or by configuration of reconfigurable components and configured with the virtualization logic 1697. As shown in the example of FIG. 16, the reconfigurable data processor 1610 includes an array 1690 of configurable units and a configuration load/unload controller 1695.

The virtualization logic 1697 can include resources that support or enable simultaneous execution of multiple, unrelated application graphs (or related ones) in an array of configurable units on one die or one multichip module. In the illustration, a first application graph is implemented in virtual machine VM1 in a particular set 1697 of configurable units, and a second application graph is implemented in virtual machine VM2 in another set 1699 of configurable units.

Figure 19:
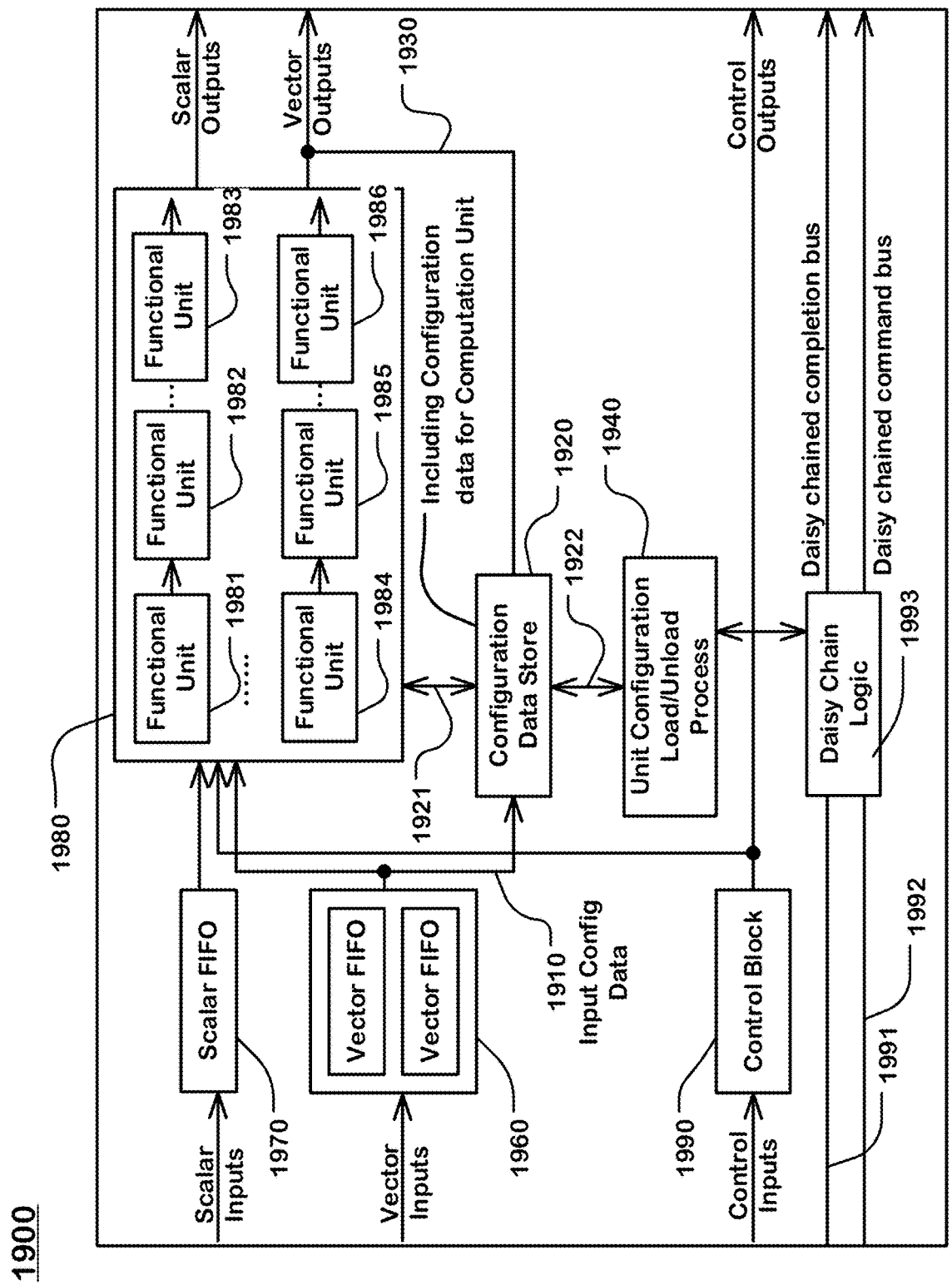
FIG. 19 is a block diagram illustrating an example configurable unit, such as a Pattern Compute Unit (PCU).
Figure 20:
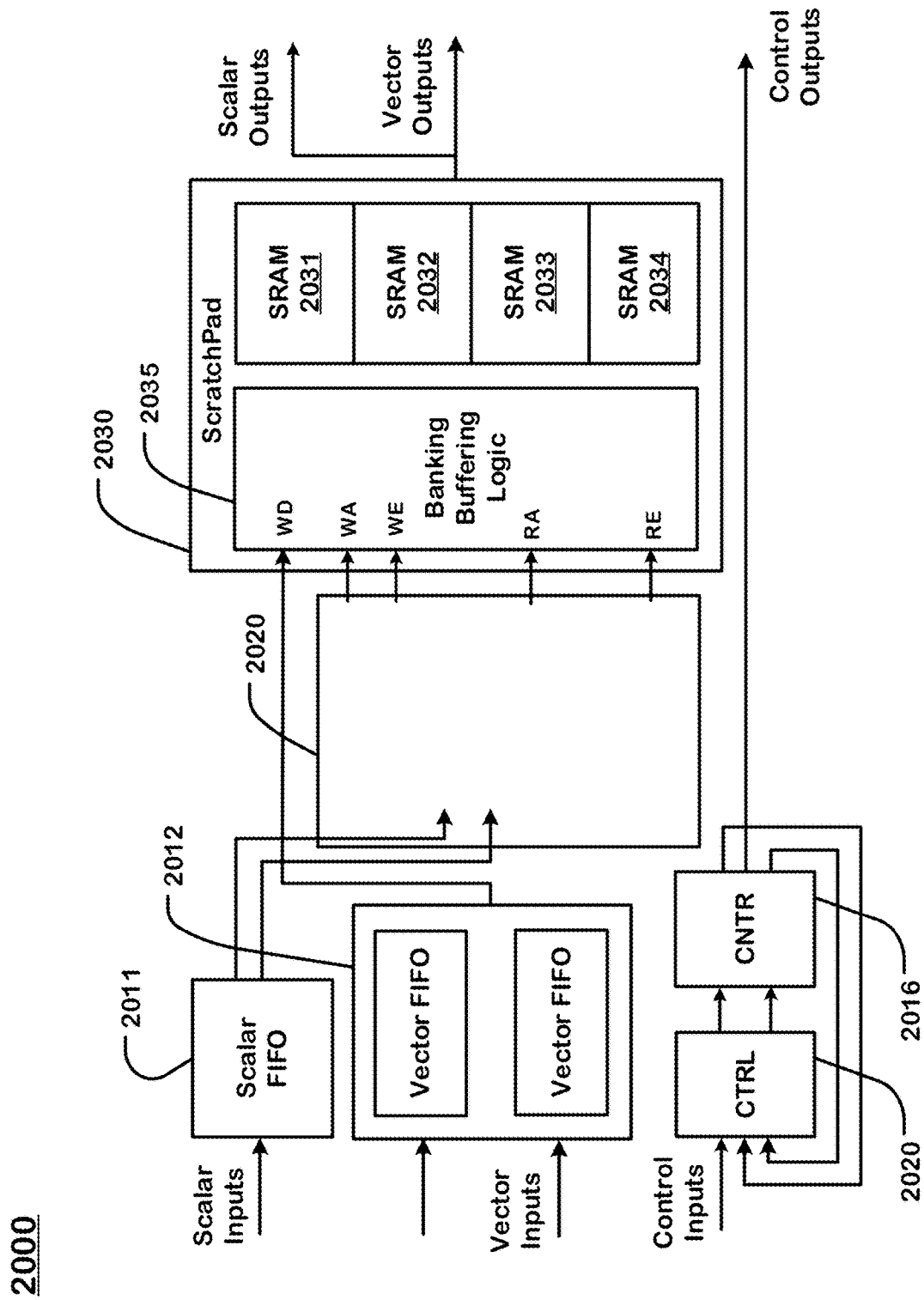
FIG. 20 is a block diagram illustrating an example configurable unit, such as a Pattern Memory Unit (PMU).

Configurable units in an array 1690 of configurable units are further described in reference to FIGS. 19 and 20 and configured with the virtualization logic 1697. Configurable units can include, or can have units configured to implement, a computation unit or computation units, as described herein.

The processor 1610 includes an external I/O interface 1630 connected to the host 1620 by line 1625, and an external I/O interface 1650 connected to the memory 1640 by line 16165. The I/O interfaces 1630, 1650 connect via a bus system 1615 to the array 1690 of configurable units and to the configuration load/unload controller 1695. The bus system 1615 may have a bus width of carrying one chunk of data, which can be for this example 128 bits (references to 128 bits throughout can be considered as an example chunk size more generally).

To configure configurable units in the array 1690 of configurable units with a configuration file, the host 1620 can send the configuration file to the memory 1640 via the interface 1630, the bus system 1615, and the interface 1650 in the reconfigurable data processor 1610. The configuration file can be loaded in many ways, as suits a particular architecture, including in data paths outside the configurable processor 1610. The configuration file can be retrieved from the memory 1640 via the memory interface 1650. Chunks of the configuration file can then be sent in a distribution sequence to configurable units in the array 1690 of configurable units in the reconfigurable data processor 1610.

An external clock generator 1670 or other clock line sources can provide a clock line 1675 or clock lines to elements in the reconfigurable data processor 1610, including the array 1690 of configurable units, and the bus system 1615, and the external data I/O interfaces. The bus system 1615 can communicate data at a processor clock rate via a clock line 1675 or clock lines.

Figure 17:
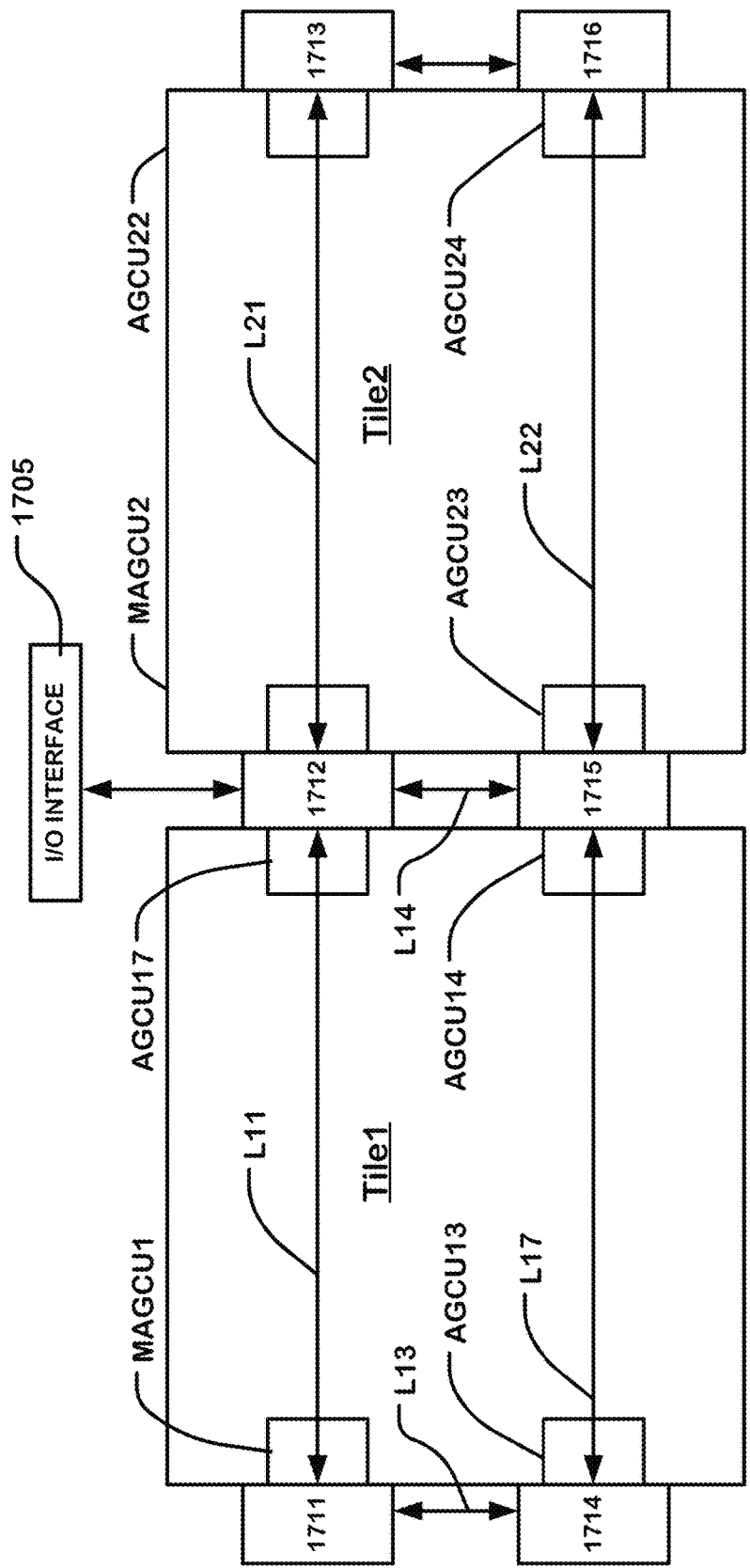
FIG. 17 is a simplified block diagram of a top-level network and components of a CGRA (Coarse Grain Reconfigurable Architecture).

FIG. 17 is a simplified block diagram of components of a CGRA (coarse-grained reconfigurable architecture) processor. In this example, the CGRA processor has 2 tiles (Tile1, Tile2). The tile comprises an array of configurable units connected to a bus system, including array level networks in this example. An array of configurable units (e.g., 1690, FIG. 16) in the tile includes computation units in hardware or by configuration of reconfigurable components, which are configured with the virtualization logic 1697. The bus system includes a top-level network connecting the tiles to external I/O interface 1705 (or any number of interfaces). In other embodiments, different bus system configurations may be utilized. The configurable units in each tile are nodes on the array level network in this embodiment.

Each of the tiles has 4 AGCUs (Address Generation and Coalescing Units) (e.g., MAGCU1, AGCU17, AGCU13, AGCU14). The AGCUs are nodes on the top-level network and nodes on the array level networks and include resources for routing data among nodes on the top-level network and nodes on the array level network in each tile.

Nodes on the top-level network in this example include one or more external I/Os, including interface 1705. The interfaces to external devices include resources for routing data among nodes on the top-level network and external devices, such as high-capacity memory, host processors, other CGRA processors, FPGA devices and so on, that are connected to the interfaces.

One of the AGCUs in a tile is configured in this example to be a master AGCU, which includes an array configuration load/unload controller for the tile. In other embodiments, more than one array configuration load/unload controller can be implemented, and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top-level network and the array level network or networks.

The top-level network is constructed using top-level switches (1711-1716) connecting to each other as well as to other nodes on the top-level network, including the AGCUs, and I/O interface 1705. The top-level network includes links (e.g., L16, L17, L21, L22) connecting the top-level switches. Data travels in packets between the top-level switches on the links, and from the switches to the nodes on the network connected to the switches. For example, top-level switches 1716 and 1712 are connected by a link L16, top-level switches 1714 and 1715 are connected by a link L17, top-level switches 1716 and 1714 are connected by a link L13, and top-level switches 1712 and 1713 are connected by a link L21. The links can include one or more buses and supporting control lines, including for example a chunk-wide bus (vector bus). For example, the top-level network can include data, request and response channels operable in coordination for transfer of data in a manner analogous to an AXI compatible protocol. See, AMBA® AXI and ACE Protocol Specification, ARM, 2017.

Top-level switches can be connected to AGCUs. For example, top-level switches 1716, 1712, 1714, and 1715 are connected to MAGCU1, AGCU17, AGCU13 and AGCU14 in the tile Tile1, respectively. Top-level switches 1712, 1713, 1715, and 1716 are connected to MAGCU2, AGCU22, AGCU23 and AGCU24 in the tile Tile2, respectively.

Top-level switches can be connected to one or more external I/O interfaces (e.g., interface 1705).

Figure 18B:
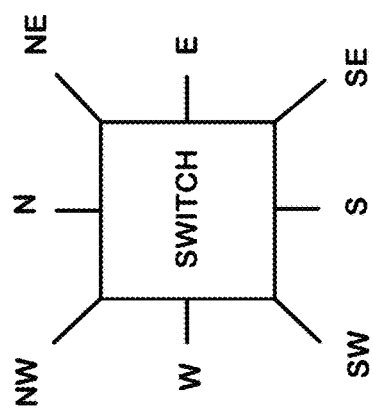
FIG. 18B illustrates an example switch unit connecting elements in an array level network.
Figure 18A:
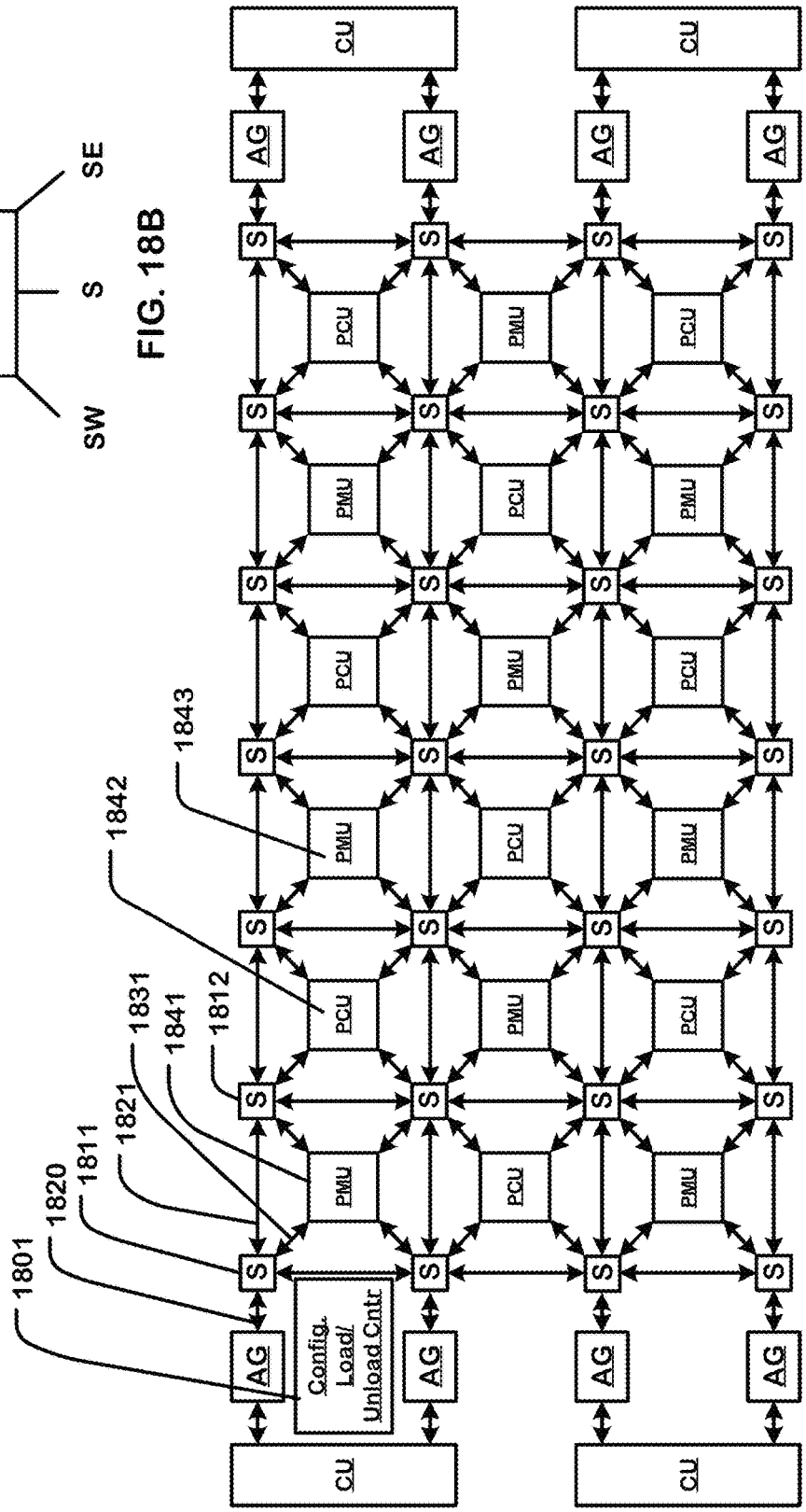
FIG. 18A is a simplified diagram of a tile and an array level network usable in the configuration of FIG. 16, where the configurable units are nodes on the array level network and are configurable to implement a lookup table with input offsetting.

FIG. 18A is a simplified diagram of a tile and an array level network usable in the configuration of FIG. 17, where the configurable units in the array are nodes on the array level network and are configurable to implement the virtualization logic 1697.

In this example, the array of configurable units 1800 includes a plurality of types of configurable units, which are configured with the virtualization logic 1697. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns," ISCA '17, Jun. 24-28, 2017, Toronto, ON, Canada, which is incorporated by reference as if fully set forth herein. In this example, the PCUs (e.g., 1842) and PMUs (e.g., 1843) in the array of configurable units 1800 can include resources configurable for embodiment of a computation unit, an example configuration of which is described herein (FIGS. 8A, 8B, and 9). Each of these configurable units contains a configuration store comprising a set of registers or flip-flops that represent either the setup or the sequence to run a program, and can include the number of nested loops, the limits of each loop iterator, the routes and/or instructions to be executed for each stage including stages, the source of the operands, and the network parameters for the input and output interfaces. The configuration file can include entries of lookup tables as described herein.

Additionally, each of these configurable units contains a configuration store comprising a set of registers or flip-flops that store status usable to track progress in nested loops or otherwise. A configuration file in the configuration store contains a bit-stream representing the initial configuration, or starting state, of each of the components that execute the program. This bit-stream is referred to as a bit file. Program load is the process of setting up the configuration stores in the array of configurable units based on the contents of the bit file to allow the components to execute a program (i.e., a machine), including programs that utilize the virtualization logic 1697. Program Load may also require the load of all PMU memories.

The array level network includes links interconnecting configurable units in the array. The links in the array level network include one or more and, in this case, three kinds of physical buses: a chunk-level vector bus (e.g., 128 bits of data), a word-level scalar bus (e.g., 32 bits of data), and a multiple bit-level control bus. For instance, interconnect 1821 between switch units 1816 and 1812 includes a vector bus interconnect with a vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload and carry scalar operands or control information. In some machines implemented using this system, data can be represented using floating point data formats, including standard or non-standard formats. Example formats include FP32 and BF16, among others. It can be understood that the number of data values carried on the scalar and vector buses is a function of the encoding format of the data values, with FP32 utilizing 32 bits per value and BF16 using 16 bits per value.

The control bus can carry control handshakes such as tokens and other lines. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:
A bit to indicate if the chunk is scratchpad memory or configuration store data.
Bits that form a chunk number.
Bits that indicate a column identifier.
Bits that indicate a row identifier.
Bits that indicate a component identifier.

For a load operation, the configuration load controller can send the number N of chunks to a configurable unit in order from N−1 to 0. For this example, the 6 chunks are sent out in most-significant-bit-first order of Chunk 5→Chunk 4→Chunk 3→Chunk 2→Chunk 1→Chunk 0. (Note that this most-significant-bit-first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first.

FIG. 18B illustrates an example switch unit connecting elements in an array level network. As shown in the example of FIG. 18B, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. A set of 2 switch units in each tile quadrant have connections to an Address Generation and Coalescing Unit (AGCU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1841 can be sent from the configuration load/unload controller 1801 to the PMU 1841, via a link 1820 between the configuration load/unload controller 1801 and the West (W) vector interface of the switch unit 1816, the switch unit 1816, and a link 1831 between the Southeast (SE) vector interface of the switch unit 1816 and the PMU 1841.

In this example, one of the AGCUs is configured to be a master AGCU, which includes a configuration load/unload controller (e.g., 1801). The master AGCU implements a register through which the host (1620, FIG. 16) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy-chained command bus (FIG. 16). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top-level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process, in a component are connected in a serial chain and can be loaded through a process of shifting bits through the serial chain. In some embodiments, there may be more than one serial chain arranged in parallel or in series. When a configurable unit receives the for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (1650, FIG. 16). Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

FIG. 19 is a block diagram illustrating an example configurable unit 1900, such as a Pattern Compute Unit (PCU), which is configured with the virtualization logic 1697. A configurable unit can interface with the scalar, vector, and control buses, in this example using three corresponding sets of inputs and outputs (TO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1990, and control outputs are provided by the control block 1990.

Each vector input is buffered in this example using a vector FIFO in a vector FIFO block 1960 which can include one or more vector FIFOs. Likewise, in this example, each scalar input is buffered using a scalar FIFO 1970. Using input FIFOs decouples timing between data producers and consumers and simplifies inter-configurable-unit control logic by making it robust to input delay mismatches.

A configurable unit includes multiple reconfigurable data paths in block 1980. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1920 is connected to the multiple data paths in block 1980 via lines 1921.

A configurable data path organized as a multi-stage pipeline can include multiple functional units (e.g., 1981, 1982, 1983, 1984, 1985, 1986) at respective stages. A computation unit or parts of a computation unit can be implemented in multiple functional units at respective stages in a multi-stage pipeline or in multiple multi-stage pipelines, as described in FIG. 15. In the example as shown in FIG. 15, a circuit including the virtualization logic 1697 can be implemented in multiple functional units and multiple memory units. Input registers in functional units can register inputs from scalar FIFOs 1970 or Vector FIFOs 1960 or from previous stages in a multi-stage pipeline. A functional unit at a stage in a multi-stage pipeline can execute a function, e.g., logical shift, an arithmetic function, comparison, a logical operation, etc., and generate an output.

Configurable units in the array of configurable units include configuration data stores 1920 (e.g., serial chains) to store unit files comprising a plurality of chunks (or sub-files of other sizes) of configuration data particular to the corresponding configurable units. Configurable units in the array of configurable units each include unit configuration load logic 1940 connected to the configuration data store 1920 via line 1922, to execute a unit configuration load process. The unit configuration load process includes receiving, via the bus system (e.g., the vector inputs), chunks of a unit file particular to the configurable unit and loading the received chunks into the configuration data store 1920 of the configurable unit. The unit file loaded into the configuration data store 1920 can include configuration data, including opcodes and routing configuration, for circuits (e.g., module) implementing the virtualization logic 1697 in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1910 can be provided to a vector FIFO as vector inputs, and then be transferred to the configuration data store 1920. Output configuration data 1930 can be unloaded from the configuration data store 1920 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 19, a control block 1990, a daisy-chained completion bus 1991 and a daisy-chained command bus 1992 are connected to daisy-chain logic 1993, which communicates with the unit configuration load logic 1940. The daisy-chain logic 1993 can include load complete status logic, as described below. The daisy-chained completion bus is further described below. Other topologies for the command and completion buses are clearly possible but not described here.

FIG. 20 is a block diagram illustrating an example configurable unit 2000, such as a Pattern Memory Unit (PMU), which is configured with the virtualization logic 1697 (i.e., the ready-to-read credit counter, the write credit counter, and the flow control logic for operating them). A PMU can contain scratchpad memory 2030 coupled with a reconfigurable scalar data path 2020 intended for address calculation (RA, WA) and control (WE, RE) of the scratchpad memory 2030, along with the bus interfaces used in the PCU (FIG. 19).

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 2031-2034). Banking and buffering logic 2035 for the SRAM banks in the scratchpad can be configured to operate in several banking modes to support various access patterns. A computation unit as described herein can include a lookup table stored in the scratchpad memory 2030, from a configuration file or from other sources. In a computation unit as described herein, the scalar data path 2020 can translate a section of a raw input value I for addressing lookup tables implementing a function f(I), into the addressing format utilized by the SRAM scratchpad memory 2030, adding appropriate offsets and so on, to read the entries of the lookup table stored in the scratchpad memory 2030 using the sections of the input value I. Each PMU can include write address calculation logic and read address calculation logic that provide write address WA, write enable WE, read address RA and read enable RE to the banking buffering logic 2035. Based on the state of the local FIFOs 2016 and 2012 and external control inputs, the control block 2020 can be configured to trigger the write address computation, read address computation, or both, by enabling the appropriate counters 2016. A programmable counter chain (Control Inputs, Control Outputs) and control block 2020 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A system, comprising:
a plurality of reconfigurable data flow resources, reconfigurable data flow resources in the plurality of reconfigurable data flow resources including a plurality of reconfigurable processors, reconfigurable processors in the plurality of reconfigurable processors including an array of configurable units, and the array of configurable units partitionable into a plurality of subarrays of configurable units;
a plurality of transfer resources usable by the reconfigurable data flow resources to receive and send to a plurality of storage resources usable by the reconfigurable data flow resources to store data; and
a runtime processor configured with logic to:
present a unified interface to the plurality of reconfigurable data flow resources, the plurality of transfer resources, and the plurality of storage resources, wherein the unified interface enables attachment of one of the configurable units to every other one of the configurable units;
control execution of a plurality of application graphs based on an execution file wherein the application graphs are representations of how the configurable units interact to exchange data to provide data flow with each other through the unified interface, the execution file including configuration files for application graphs in the plurality of application graphs, topologies for subarrays of configurable units in the plurality of subarrays of configurable units with the topologies indicating how to load the configuration files so that the configurable units interact to exchange data according to the application graphs, and resource requests for transfer resources in the plurality of transfer resources and storage resources in the plurality of storage resources required to satisfy data flow for the topologies according to the application graphs;
allocate the subarrays of configurable units to the application graphs based on the topologies;
allocate the transfer resources and the storage resources to the application graphs based on the resource requests; and
load and execute the configuration files using the allocated subarrays of configurable units, transfer resources, and storage resources.

2. The system of claim 1, wherein the topologies specify a set of two or more subarrays of configurable units of a single reconfigurable processor along a vertical and horizontal orientation of the set of subarrays of configurable units.

3. The system of claim 1, wherein the topologies specify a set of subarrays of configurable units spanning two or more reconfigurable processors.

4. The system of claim 1, wherein the runtime processor allocates one or more subarrays of configurable units of a single reconfigurable processor to two or more configuration files of two or more application graphs based on the topologies according to the application graphs, and wherein a device driver concurrently loads and executes the two or more configuration files on the subarrays of the single reconfigurable processor.

5. The system of claim 1, wherein the runtime processor allocates subarrays of two or more reconfigurable processors to a single configuration file of a single application graph based on the topologies, and wherein a device driver concurrently loads and executes the single configuration file on the subarrays of the two or more reconfigurable processors.

* * * * *